US007988559B2

(12) United States Patent
Yoseloff et al.

(10) Patent No.: US 7,988,559 B2
(45) Date of Patent: Aug. 2, 2011

(54) COMPUTERIZED GAMING SYSTEM, METHOD AND APPARATUS

(75) Inventors: Mark L. Yoseloff, Henderson, NV (US); Mark D. Jackson, Fort Collins, CO (US); Michael G. Martinek, Fort Collins, CO (US); Donald A. Brower, Fort Collins, CO (US); John L. DeJournett, Greeley, CO (US)

(73) Assignee: IGT, Reno, NV (US)

( * ) Notice: Subject to any disclaimer, the term of this patent is extended or adjusted under 35 U.S.C. 154(b) by 1245 days.

(21) Appl. No.: 10/182,469

(22) PCT Filed: Mar. 8, 2001

(86) PCT No.: PCT/US01/07447

§ 371 (c)(1), (2), (4) Date: Jul. 26, 2002

(87) PCT Pub. No.: WO02/073501

PCT Pub. Date: Sep. 19, 2002

(65) Prior Publication Data

US 2003/0224858 A1 Dec. 4, 2003

(51) Int. Cl.
*A63F 9/24* (2006.01)
*G06F 5/00* (2006.01)

(52) U.S. Cl. ................ 463/42; 463/40; 463/41; 463/25; 463/16; 380/251; 380/258

(58) Field of Classification Search .............. 463/16–20, 463/43, 40–41, 42, 25, 29; 380/251, 258
See application file for complete search history.

(56) References Cited

U.S. PATENT DOCUMENTS 2,235,642 A 3/1941 Lintern et al.
3,825,905 A 7/1974 Allen, Jr.
3,838,264 A 9/1974 Maker (Continued)

FOREIGN PATENT DOCUMENTS

DE 37 00 861 7/1988

(Continued)

OTHER PUBLICATIONS

Hystory of GSA, Web page [online]. Gaming Standards Association, 1997 [retrieved on Aug. 7, 2007] Retrieved from the Internet: <URL:http:/www.gamingstandards.com/index.php?page=what_is_gsa/history_of_gsa>, 1 page.*

(Continued)

*Primary Examiner* — Melba Bumgarner
*Assistant Examiner* — Frank M Leiva
(74) *Attorney, Agent, or Firm* — Weaver Austin Villeneuve & Sampson LLP

(57) ABSTRACT

The present invention in various embodiments provides a computerized wagering game method and apparatus that features an operating system kernel, a system handler application that loads and executes gaming program shared objects and features nonvolatile storage that facilitates sharing of information between gaming program objects. The system handler of some embodiments further provides an API library of functions callable from the gaming program objects, and facilitates the use of callback functions on change of data stored in nonvolatile storage. The nonvolatile storage also provides a nonvolatile record of the state of the computerized wagering game, providing protection against loss of the game state due to power loss. The system handler application in various embodiments includes a plurality of device handlers, providing an interface to selected hardware and the ability to monitor hardware-related events.

13 Claims, 12 Drawing Sheets

U.S. PATENT DOCUMENTS 3,931,504 A 1/1976 Jacoby
4,072,930 A 2/1978 Lucero et al.
4,193,131 A 3/1980 Lennon et al.
4,200,770 A 4/1980 Hellman et al.
4,218,582 A 8/1980 Hellman et al.
4,250,563 A 2/1981 Struger
4,293,928 A 10/1981 Baun
4,296,930 A 10/1981 Frederiksen
4,354,251 A 10/1982 Hellwig et al.
4,355,390 A 10/1982 Hellwig et al.
4,405,829 A 9/1983 Rivest et al.
4,430,728 A 2/1984 Beitel et al.
4,454,594 A 6/1984 Heffron et al.
4,458,315 A 7/1984 Uchenick
4,462,076 A 7/1984 Smith, III
4,467,424 A 8/1984 Hedges et al.
4,494,114 A 1/1985 Kaish et al.
4,500,933 A 2/1985 Chan
4,519,077 A 5/1985 Amin
4,525,599 A 6/1985 Curran et al.
4,582,324 A 4/1986 Koza et al.
4,607,844 A 8/1986 Fullerton
4,652,998 A 3/1987 Koza et al.
4,658,093 A 4/1987 Hellman
4,683,550 A 7/1987 Jindrick et al.
4,727,544 A 2/1988 Brunner et al.
4,752,068 A 6/1988 Endo
4,757,505 A 7/1988 Marrington et al.
4,759,064 A 7/1988 Chaum
4,817,140 A 3/1989 Chandra et al.
4,837,728 A 6/1989 Barrie et al.
4,845,715 A 7/1989 Francisco
4,848,744 A 7/1989 Steininger et al.
4,856,787 A 8/1989 Itkis
4,862,355 A 8/1989 Newman et al.
4,865,321 A 9/1989 Nakagawa et al.
4,911,449 A 3/1990 Dickinson et al.
4,930,073 A 5/1990 Cina, Jr.
4,944,008 A 7/1990 Piosenka et al.
4,951,149 A 8/1990 Faroudja
4,972,470 A 11/1990 Farago
5,004,232 A 4/1991 Wong et al.
5,021,772 A 6/1991 King et al.
5,050,212 A 9/1991 Dyson
5,103,081 A 4/1992 Fisher et al.
5,109,152 A 4/1992 Takagi et al.
5,146,575 A 9/1992 Nolan
5,155,768 A 10/1992 Matsuhara
5,155,856 A 10/1992 Bock et al.
5,161,193 A 11/1992 Lampson et al.
5,179,517 A 1/1993 Sarbin
5,224,160 A 6/1993 Paulini et al.
5,235,642 A 8/1993 Wobber et al.
5,259,613 A 11/1993 Marnell
5,264,958 A 11/1993 Johnson
5,283,734 A 2/1994 Von Kohorn
5,288,978 A 2/1994 Iijima
5,291,585 A 3/1994 Sato et al.
5,297,205 A 3/1994 Audebert et al.
5,326,104 A 7/1994 Pease et al.
5,342,047 A 8/1994 Heidel et al.
5,343,527 A 8/1994 Moore
5,353,411 A 10/1994 Nakaosa et al.
5,375,241 A 12/1994 Walsh
5,379,431 A 1/1995 Lemon et al.
5,388,841 A 2/1995 San et al.
5,394,547 A 2/1995 Correnti et al.
5,398,799 A 3/1995 Ranon et al.
5,398,932 A 3/1995 Eberhardt et al.
5,400,246 A 3/1995 Wilson et al.
5,421,006 A 5/1995 Jablon et al.
5,428,525 A 6/1995 Cappelaere et al.
5,429,361 A 7/1995 Raven et al.
5,442,568 A 8/1995 Ostendorf et al.
5,444,642 A 8/1995 Montgomery et al.
5,465,364 A 11/1995 Lathrop et al.
5,469,571 A 11/1995 Bunnell
5,473,765 A 12/1995 Gibbons et al.
5,473,785 A 12/1995 Lager et al.
5,488,702 A 1/1996 Byers et al.
5,489,095 A 2/1996 Goudard et al.
5,497,490 A 3/1996 Harada et al.
5,498,003 A 3/1996 Gechter
5,507,489 A 4/1996 Reibel et al.
5,508,689 A 4/1996 Rado et al.
5,542,669 A * 8/1996 Charron et al. ................. 463/13
5,548,782 A 8/1996 Michael et al.
5,553,290 A 9/1996 Calvert et al.
5,564,701 A 10/1996 Dettor
5,568,602 A 10/1996 Callahan et al.
5,575,717 A 11/1996 Houriet, Jr. et al.
5,586,766 A 12/1996 Forte et al.
5,586,937 A 12/1996 Menashe
5,592,609 A 1/1997 Suzuki et al.
5,594,903 A 1/1997 Bunnell et al.
5,604,801 A 2/1997 Dolan et al.
5,611,730 A 3/1997 Weiss
5,634,058 A 5/1997 Allen et al.
5,643,086 A 7/1997 Alcorn et al.
5,644,704 A 7/1997 Pease et al.
5,655,965 A 8/1997 Takemoto et al.
5,664,187 A 9/1997 Burkes et al.
5,668,945 A 9/1997 Ohba et al.
5,671,351 A 9/1997 Wild et al.
5,688,174 A 11/1997 Kennedy
5,702,303 A 12/1997 Takemoto et al.
5,704,835 A 1/1998 Dietz, II
5,707,286 A 1/1998 Carlson
5,707,288 A 1/1998 Stephens
5,725,428 A 3/1998 Achmuller
5,737,418 A 4/1998 Saffari et al.
5,742,616 A 4/1998 Torreiter et al.
5,742,825 A 4/1998 Mathur et al.
5,752,882 A 5/1998 Acres et al.
5,758,875 A 6/1998 Giacalone, Jr.
5,759,102 A 6/1998 Pease et al.
5,761,647 A 6/1998 Boushy
5,768,382 A 6/1998 Schneier et al.
5,770,533 A * 6/1998 Franchi ........................... 463/42
5,778,226 A 7/1998 Adams et al.
5,800,268 A 9/1998 Molnick
5,809,329 A 9/1998 Lichtman et al.
5,810,665 A 9/1998 Takemoto et al.
5,823,874 A 10/1998 Adams
5,848,250 A 12/1998 Smith et al.
5,848,932 A 12/1998 Adams
5,851,149 A 12/1998 Xidos et al.
5,863,041 A 1/1999 Boylan et al.
5,870,587 A 2/1999 Danforth et al.
5,871,400 A 2/1999 Yfantis
5,872,973 A 2/1999 Mitchell et al.
5,879,234 A 3/1999 Mengual
5,889,990 A 3/1999 Coleman et al.
5,893,121 A 4/1999 Ebrahim et al.
5,901,319 A 5/1999 Hirst
5,934,672 A 8/1999 Sines et al.
5,935,224 A 8/1999 Svancarek et al.
5,944,821 A 8/1999 Angelo
5,954,583 A 9/1999 Green
5,970,143 A 10/1999 Schneier et al.
5,971,851 A 10/1999 Pascal et al.
5,980,384 A 11/1999 Barrie
5,984,786 A 11/1999 Ehrman
5,989,234 A 11/1999 Valerio et al.
5,991,399 A 11/1999 Graunke et al.
5,991,546 A 11/1999 Chan et al.
5,995,745 A 11/1999 Yodaiken
5,999,990 A 12/1999 Sharrit et al.
6,003,038 A 12/1999 Chen
6,006,279 A 12/1999 Hayes
6,008,279 A 12/1999 Shimizu et al.
6,014,714 A 1/2000 Plyler et al.
6,015,344 A 1/2000 Kelly et al.
6,021,414 A 2/2000 Fuller
6,026,238 A 2/2000 Bond et al.
6,035,321 A 3/2000 Mays
6,039,645 A 3/2000 Mazur

| | | | | |
|---|---|---|---|---|
| 6,039,648 | A | 3/2000 | Guinn et al. | |
| 6,044,428 | A | 3/2000 | Rayabhari | |
| 6,044,471 | A | 3/2000 | Colvin | |
| 6,052,778 | A | 4/2000 | Hagy et al. | |
| 6,071,190 | A | 6/2000 | Weiss et al. | |
| 6,073,124 | A | 6/2000 | Krishnan et al. | |
| 6,075,939 | A | 6/2000 | Bunnell et al. | |
| 6,099,408 | A | 8/2000 | Schneier et al. | |
| 6,102,796 | A | 8/2000 | Pajitnov et al. | |
| 6,104,815 | A | 8/2000 | Alcorn et al. | |
| 6,104,859 | A | 8/2000 | Yoshida et al. | |
| 6,106,396 | A * | 8/2000 | Alcorn et al. | 463/29 |
| 6,115,601 | A | 9/2000 | Ferreira | |
| 6,117,010 | A | 9/2000 | Canterbury et al. | |
| 6,126,548 | A | 10/2000 | Jacobs et al. | |
| 6,134,677 | A | 10/2000 | Lindsay | |
| 6,135,884 | A | 10/2000 | Hedrick et al. | |
| 6,135,887 | A | 10/2000 | Pease et al. | |
| 6,139,433 | A | 10/2000 | Miyamoto | |
| 6,149,522 | A | 11/2000 | Alcorn et al. | |
| 6,162,122 | A | 12/2000 | Acres et al. | |
| 6,164,971 | A | 12/2000 | Figart | |
| 6,165,072 | A | 12/2000 | Davis et al. | |
| 6,181,336 | B1 | 1/2001 | Chiu et al. | |
| 6,185,678 | B1 | 2/2001 | Arbaugh et al. | |
| 6,193,606 | B1 | 2/2001 | Walker et al. | |
| 6,195,587 | B1 | 2/2001 | Hruska et al. | |
| 6,203,427 | B1 | 3/2001 | Walker et al. | |
| 6,210,274 | B1 | 4/2001 | Carlson | |
| 6,214,495 | B1 | 4/2001 | Segawa et al. | |
| 6,215,495 | B1 * | 4/2001 | Grantham et al. | 345/419 |
| 6,222,448 | B1 | 4/2001 | Beck et al. | |
| 6,222,529 | B1 | 4/2001 | Ouatu-Lascar et al. | |
| 6,224,482 | B1 | 5/2001 | Bennett | |
| 6,243,692 | B1 | 6/2001 | Floyd et al. | |
| 6,251,014 | B1 | 6/2001 | Stockdale et al. | |
| 6,253,374 | B1 | 6/2001 | Dresevic et al. | |
| 6,263,392 | B1 | 7/2001 | McCauley | |
| 6,264,557 | B1 | 7/2001 | Schneier et al. | |
| 6,269,474 | B1 | 7/2001 | Price | |
| 6,273,814 | B1 | 8/2001 | Komoto | |
| 6,279,124 | B1 | 8/2001 | Brouwer et al. | |
| 6,290,602 | B1 | 9/2001 | Kawano | |
| 6,315,666 | B1 | 11/2001 | Mastera et al. | |
| 6,319,125 | B1 | 11/2001 | Acres | |
| 6,322,445 | B1 | 11/2001 | Miller | |
| 6,324,605 | B1 | 11/2001 | Rafferty et al. | |
| 6,327,605 | B2 | 12/2001 | Arakawa et al. | |
| 6,331,146 | B1 | 12/2001 | Miyamoto et al. | |
| 6,364,769 | B1 | 4/2002 | Weiss et al. | |
| 6,368,219 | B1 | 4/2002 | Szrek et al. | |
| 6,379,246 | B1 | 4/2002 | Dabrowski | |
| 6,394,907 | B1 * | 5/2002 | Rowe | 463/42 |
| 6,401,208 | B2 | 6/2002 | Davis et al. | |
| 6,409,602 | B1 | 6/2002 | Wiltshire et al. | |
| 6,446,211 | B1 | 9/2002 | Colvin | |
| 6,446,257 | B1 | 9/2002 | Pradhan et al. | |
| 6,449,687 | B1 | 9/2002 | Moriya | |
| 6,453,319 | B1 | 9/2002 | Mattis et al. | |
| 6,454,648 | B1 | 9/2002 | Kelly et al. | |
| 6,460,142 | B1 | 10/2002 | Colvin | |
| 6,484,264 | B1 | 11/2002 | Colvin | |
| 6,496,808 | B1 | 12/2002 | Aiello et al. | |
| 6,502,195 | B1 | 12/2002 | Colvin | |
| 6,505,087 | B1 | 1/2003 | Lucas et al. | |
| 6,510,521 | B1 | 1/2003 | Albrecht et al. | |
| 6,527,638 | B1 | 3/2003 | Walker et al. | |
| 6,577,733 | B1 | 6/2003 | Charrin | |
| 6,595,856 | B1 | 7/2003 | Ginsburg et al. | |
| 6,620,047 | B1 | 9/2003 | Alcorn et al. | |
| 6,671,745 | B1 | 12/2003 | Mathur et al. | |
| 6,785,825 | B2 | 8/2004 | Colvin | |
| 6,792,548 | B2 | 9/2004 | Colvin | |
| 6,792,549 | B2 | 9/2004 | Colvin | |
| 6,795,925 | B2 | 9/2004 | Colvin | |
| 6,795,928 | B2 | 9/2004 | Bradley et al. | |
| 6,799,277 | B2 | 9/2004 | Colvin | |
| 6,804,763 | B1 | 10/2004 | Stockdale et al. | |
| 6,805,634 | B1 | 10/2004 | Wells et al. | |
| 6,813,717 | B2 | 11/2004 | Colvin | |
| 6,813,718 | B2 | 11/2004 | Colvin | |
| 6,851,607 | B2 | 2/2005 | Orus et al. | |
| 6,857,067 | B2 | 2/2005 | Edelman | |
| 6,857,078 | B2 | 2/2005 | Colvin | |
| 6,866,581 | B2 | 3/2005 | Martinek et al. | |
| 6,902,481 | B2 | 6/2005 | Breckner et al. | |
| 6,908,391 | B2 | 6/2005 | Gatto et al. | |
| 6,935,946 | B2 | 8/2005 | Yoseloff et al. | |
| 6,962,530 | B2 | 11/2005 | Jackson | |
| 6,978,465 | B2 | 12/2005 | Williams | |
| 6,988,267 | B2 * | 1/2006 | Harris et al. | 717/173 |
| 7,043,641 | B1 | 5/2006 | Martinek et al. | |
| 7,063,615 | B2 | 6/2006 | Alcorn et al. | |
| 7,116,782 | B2 | 10/2006 | Jackson et al. | |
| 7,203,841 | B2 | 4/2007 | Jackson et al. | |
| 7,470,182 | B2 | 12/2008 | Martinek et al. | |
| 7,618,317 | B2 | 11/2009 | Jackson | |
| 2001/0003709 | A1 * | 6/2001 | Adams | 463/20 |
| 2001/0010046 | A1 | 7/2001 | Muyres et al. | |
| 2001/0044339 | A1 | 11/2001 | Cordero | |
| 2001/0053712 | A1 | 12/2001 | Yoseloff | |
| 2002/0049909 | A1 | 4/2002 | Jackson et al. | |
| 2002/0052230 | A1 | 5/2002 | Martinek et al. | |
| 2002/0078142 | A1 | 6/2002 | Moore et al. | |
| 2002/0082084 | A1 * | 6/2002 | Snow et al. | 463/42 |
| 2002/0116284 | A1 | 8/2002 | Steelman et al. | |
| 2002/0151363 | A1 | 10/2002 | Letovsky et al. | |
| 2003/0014639 | A1 | 1/2003 | Jackson et al. | |
| 2003/0069074 | A1 * | 4/2003 | Jackson | 463/43 |
| 2003/0078103 | A1 | 4/2003 | LeMay et al. | |
| 2003/0181242 | A1 | 9/2003 | Lee et al. | |
| 2003/0195033 | A1 | 10/2003 | Gazdic et al. | |
| 2003/0203755 | A1 | 10/2003 | Jackson | |
| 2003/0203756 | A1 | 10/2003 | Jackson | |
| 2004/0002381 | A1 | 1/2004 | Alcorn et al. | |
| 2004/0038740 | A1 * | 2/2004 | Muir | 463/40 |
| 2004/0043814 | A1 * | 3/2004 | Angell et al. | 463/25 |
| 2004/0072611 | A1 * | 4/2004 | Wolf et al. | 463/20 |
| 2004/0106452 | A1 | 6/2004 | Nguyen et al. | |
| 2004/0198479 | A1 | 10/2004 | Martinek et al. | |
| 2004/0198494 | A1 * | 10/2004 | Nguyen et al. | 463/42 |
| 2005/0192092 | A1 | 9/2005 | Breckner et al. | |
| 2006/0123391 | A1 | 6/2006 | Lai | |
| 2006/0287098 | A1 * | 12/2006 | Morrow et al. | 463/42 |
| 2007/0015590 | A1 | 1/2007 | Martinek et al. | |
| 2007/0270212 | A1 | 11/2007 | Cockerille et al. | |
| 2008/0058055 | A1 | 3/2008 | LeMay et al. | |
| 2008/0058097 | A1 | 3/2008 | Martinek et al. | |
| 2008/0096656 | A1 | 4/2008 | LeMay et al. | |
| 2008/0102919 | A1 | 5/2008 | Rowe et al. | |

FOREIGN PATENT DOCUMENTS

| | | | |
|---|---|---|---|
| DE | 40 14 477 | | 7/1991 |
| EP | 0 317 477 | | 5/1989 |
| EP | 0 685 246 | | 12/1995 |
| EP | 0 762 302 | | 3/1997 |
| EP | 0 798 634 | | 10/1997 |
| EP | 0 996 058 | | 10/1998 |
| EP | 0 950 998 | | 10/1999 |
| EP | 0 953 930 | | 11/1999 |
| EP | 1 035 658 | A1 | 9/2000 |
| EP | 1 255 234 | | 11/2002 |
| GB | 2 072 395 | | 9/1981 |
| GB | 2 121 569 | | 12/1983 |
| GB | 2 147 773 | | 5/1985 |
| GB | 2 201 821 | | 9/1988 |
| GB | 2 202 984 | | 10/1988 |
| GB | 2 253 325 | | 9/1992 |
| GB | 2 282 690 | | 4/1995 |
| RU | 2 102 790 | C1 | 7/1995 |
| RU | 2 099 782 | C1 | 12/1997 |
| RU | 2 174 258 | C2 | 9/2001 |
| SU | 1 815 666 | A1 | 3/1993 |
| WO | 94/19784 | | 9/1994 |
| WO | 96/00939 | | 1/1996 |
| WO | 96/00950 | | 1/1996 |
| WO | WO 96/14614 | | 5/1996 |
| WO | 98/00207 | | 1/1998 |

| | | |
|---|---|---|
| WO | 98/20417 | 5/1998 |
| WO | 99/09474 | 2/1999 |
| WO | WO 99/49394 | 9/1999 |
| WO | WO 99/65579 | 12/1999 |
| WO | 00/33196 | 6/2000 |
| WO | 01/22267 | 3/2001 |
| WO | WO 02/32526 | 4/2002 |
| WO | 02/072395 | 9/2002 |
| WO | 02/073501 | 9/2002 |
| WO | WO 03/023647 | 3/2003 |
| WO | WO 2006/002084 | 1/2006 |

OTHER PUBLICATIONS

Value Proposition, Web page [online]. Gaming Standards Association,1997 [retrieved on Aug. 7, 2007] Retrieved from the Internet: <URL:http:/www.gamingstandards.com/index.php?page=what_is_gsa/value_proposition>, 2 pages.*

"An Operating System for Single-User Machine", by Butler W Lampson and Rober F Sproull. Published in ACM Operating Systems Review 11, 5 (Dec. 1979), pp. 98-105. Retrieved from Internet Oct. 26, 2009. <URL: http://research.microsoft.com/en-us/um/people/blampson/22-openos/acrobat.pdf>.*

"open-system" definition from YourDictionary.com, retrieved Oct. 27, 2009 from <URL:http://www.yourdictionary.com/computer/open-system>.*

PCT Search Report mailed Mar. 8, 2001 (6 pgs.).

Retro Fitting a Low-Boy Arcade Machine with a Pentium-Powered M.A.M.E. Setup, Oct. 1996, www.Cygnus.uwa.edu.au/~jaycole/jaw/arcade/html. (5 pgs.).

RTD USA, www.rtdusa.com (1998), downloaded from the Internet on Mar. 20, 2003 pp. 1-49.

Mardsen et al., Development of a PC-Windows Based Universal Control System, $5^{th}$ Intl. Conf. on Factory 2000, Apr. 2-4, 1997, Conf. Publ. No. 435, pp. 284-287.

Paul Virgo, Embedded PC's for the Industrial Marketplace: An Analysis of the STD Bus, WESCON/'93. Conference Record, Sep. 28-30, 1993, pp. 621-623.

Jahn Luke et al., A commercial off-the-shelf based replacement strategy for aging avionics computers, Aerospace and Electronics Conference, 1998. NAECON 1998, Proceedings of the IEEE 1998 National, Jul. 13-17, 1998, pp. 177-181.

D. Powell et al., GUARDS: a generic upgradeable architecture for real-time dependable systems, Parallel and Distributed Systems, IEEE Translations on, vol. 10, Issue: 6, Jun. 1999, pp. 580-599.

Robert A. Burkle, PC/104 Embedded Modules: The New Systems Components, http://www.winsystems.com/papers.sys_componenents.pdf downloaded from the Internet on Mar. 20, 2003, pp. 1-3.

WinSystems, http://webarchive.org/web/19881212034126/-http://winsystems.com/ (Dec. 12, 1998), downloaded from the Internet on Oct. 27, 2003, all pages.

RTDUSA, www.http://webarchive.org.web/19904220910 26/-http://rtdusa.com/ (Apr. 22, 1999), downloaded from the internet on Oct. 27, 2003, all pages.

WinSystems, www.winsystems.com downloaded from the internet on Apr. 2, 2003, pp. 1-25.

Jim Blazer, PC/104 Intelligent Data Acquisition, PC/104 Embedded Solutions (Spring 1998), pp. 102.

Robert A. Burkle, STD Bus: Performance without Complexity, http://www.winsystems.com/papers/stdperformance.pdf (Aug. 1, 2001), pp. 1-3.

Craig Matasumoto, Intel starts preaching about security, EE Times http://eetimes.com/story/OEG19990121S0014 (Jan. 21, 1999), pp. 1-4.

Rick Lehrbaum, "Why Linux" <http://linuxdevices.com/cgi-bin/printerfriendly.cgi?id=AT9663974466> (Jan. 31, 2000), pp. 1-2.

Rick Lehrbaum, "Why Linux", <http://linuxdevices.com/cgi-bin/printerfriendly.cgi?id=AT3611822672> (Feb. 19, 2000), pp. 1-5.

David A. Rusling, The Linux Kernel <http://www.tidp.org/LDP/tlk.htm> (1999), (168 pgs.).

OnCore Systems, http://www.oncoresystems.com (1999)(8 pgs.).

Encyclopedia, http://www.eetnetwork.com/encyclopedia,(2002)(7 pgs.).

Michael Tiemann, "Why Embedded Linux" http://linuxdevices.com/cgi-bin/printerfriendly.cgi?id=AT8926600504 (Oct. 28, 1999),(6 pgs.).

Retro Fitting a Low-Boy Arcade Machine with a Pentium-Powered M.A.M.E. Setup, Oct. 1996, www.Cygnus.uwa.edu.au/~jaycole/jaw/arcade.html (5 pgs.).

Object-Oriented Programming Concepts, Sun Microsystems, Inc. (2002), (16 pgs.).

Terry Monlick, What is Object-Oriented Software, Software Design Consultants, LLC (1999), (5 pgs.).

Answer and Counterclaims to Second Amended Complaint filed in connection with Civil Action No. CV-S-01-1498, pp. 1-26 and certificate of service page.

Answer and Counterclaims to Second Amended Complaint filed in connection with Civil Action No. CV-S-01-1498, (pp. 1-3, 50-68 and 85-86).

Defendants', Supplemental Response to Plaintiffs' First Set of Interrogatories filed in connection with Civil Action No. CV-S-01-1498, pp. 1-3, 50-68 and 85-86.

Davida, G. et al., "Defending Systems Against Viruses through Cryptographic Authentication," Proceedings of the Symposium on Security and Privacy, *IEEE Comp. Soc. Press*, pp. 312-318 (May 1, 1989).

Document entitled "Fact Sheet on Digital Signature Standard" dated May 1994, 6 pages.

Federal Information Processing Standard (FIPS) Publication 180-1 entitled "Secure Hash Standard" dated Apr. 17, 1995, 2 title pages, abstract page and pp. 1-21.

Federal Information Processing Standard (FIPS) Publication 180 entitled "Secure Hash Standard" dated May 11, 1993, title page, abstract page and pp. 1-20.

Federal Information Processing Standards (FIPS) Publication 186 entitled "Digital Signature (DSS)" dated Jan. 27, 2000, 17 pages.

Hellman, Martin E., The Mathematics Public-Key Cryptography," Scientific American," vol. 241, No. 8, Aug. 1979, pp. 146-152 and 154-157.

Rivest, et al., "A Method for Obtaining Digital Signatures and Public-Key Cryptosytems," Communications of the ACM, vol. 21, No. 2, Feb. 1978, pp. 120-126.

Bauspiess, et al., "Requirements for Cryptographic Hash Functions," *Computers and Security*, 5:427-437 (Sep. 11, 1992).

Complaint for Patent Infringement filed by Aristocrat Technologies, et al., dated Jan. 22, 2002, Civil Action No. CV-S-02-0091.

Bakhtiari et al., Cryptographic Hash Functions: A Survey, 1995, Centre for Computer Security Research, pp. 1-26.

Schneier B., "Applied Cryptography, Second Edition. Protocols, Algortihms, and Source Code in C" 1996, John Wiley & Sons, Inc. USA, XP002344241, pp. 446-449; pp. 458-459.

Menezes A., Van Oorschot P., Vanstone S.: "Handbook of Applied Cryptography" 1996, CRC Press, USA, xp002344242, pp. 365-366.

European Office Action dated Dec. 8, 2005 from related EP Application No. 02768907.4, 4 pages.

DeLourna, "Game Programming Gems", Charles River Media, ISBN: 1-58450-049-2, 2000 (12 pgs.).

DirectX Media: Multimedia Services for Microsoft Internet Explorer and Microsoft Windows, MSDN Library, http://msdn.microsoft.com, 101998 (10 pgs.).

Levinthal, Adam and Barnett, Michael, "The Silicon Gaming Odyssey Slot Machine," Feb. 1997, COMPCON '97 Proceedings, IEEE San Jose, CA; *IEEE Comput. Soc.*, pp. 296-301.

Bernardi, Favrice et al., "Model Design Using Hierarchical Web-Based Libraries", Jun. 10-14, 2002, Annual ACM IEEE Design Automation Conference, New Orleans, Louisiana, pp. 14-17.

Australian Office Action dated Dec. 12, 2005, from corresponding Australian Application No. 20021245518, 2 pages.

"Linux Kernel Glossary," entry for ZFOD (zero-fill-on-demand), http;//www.kernelnewbies.org/glossary, downloaded Feb. 22, 2006.

"Linux Kernel Glossary," entry for ZFOD (zero-fill-on-demand), http;//www.kernelnewbies.org/KernelGlossary, downloaded Jul. 7, 2007 (14 pgs.).

PCT Search Report mailed Jun. 12, 2001 from PCT/US02/07447, 5 pgs.

ISR dated May 31, 2001 from related PCT Application No. PCT/US01/07381 1pg.

ISR dated Feb. 6, 2003 from related PCT Application No. PCT/US02/30286, 2 pgs.
ISR dated Feb. 6, 2003 from related PCT Application No. PCT/US02/30286, 5 pgs.
Get Control, Inc., PC-104 DIG-10-48 Plus, http://www.getcontrol.com downloaded from the interenet on Mar. 20, 2003, p. 1.
U.S. Office Action dated Jun. 15, 2004 from related U.S. Appl. No. 10/134,657 11 pages.
U.S. Final Office Action dated Jan. 30, 2007 from related U.S. Appl. No. 10/134,657, 11 pages.
U.S. Office Action dated Jul. 31, 2007 from related U.S. Appl. No. 10/134,657, 10 pages.
EP Office Action dated Aug. 23, 2007 from related EP Application No. 02775968.7.
Bovet, D.P. et al., "Understanding the Linux Kernel" Jan. 2001, pp. 1-34, XP002332389.
U.S. Office Action dated Jun. 17, 2005 from related U.S. Appl. No. 10/241,804.
U.S. Final Office Action dated Mar. 9, 2006 from related U.S. Appl. No. 10/241,804.
U.S. Office Action dated May 31, 2007 from related U.S. Appl. No. 10/241,804.
U.S. Office Action dated Feb. 25, 2008 from related U.S. Appl. No. 10/241,804.
U.S. Office Action dated Dec. 23, 2005 from U.S. Appl. No. 10/308,845.
U.S. Final Office Action dated Jun. 2, 2006 from related U.S. Appl. No. 10/308,845.
U.S. Office Action dated Dec. 13, 2006 from U.S. Appl. No. 10/308,845.
U.S. Final Office Action dated Aug. 13, 2008 from related U.S. Appl. No. 10/134,657, 9 pgs.
U.S. Office Action dated Mar. 23, 2005 from U.S. Appl. No. 10/040,239.
U.S. Office Action dated Jun. 29, 2006 from U.S. Appl. No. 10/040,239.
U.S. Office Action dated Apr. 16, 2007 from U.S. Appl. No. 10/040,239.
U.S. Office Action dated Jan. 24, 2008 from U.S. Appl. No. 10/040,239.
Notice of Allowance dated Aug. 4, 2008 from U.S. Appl. No. 10/040,239.
Au Office Action dated Sep. 10, 2007 from AU Application No. 2002331912, 3 pgs.
Office Action dated Jan. 24, 2008 from U.S. Appl. No. 11/933,057.
Notice of Allowance dated Aug. 1, 2008 from U.S. Appl. No. 11/933,057.
Office Action dated Jul. 2, 2004 from related U.S. Appl. No. 10/041,212, 12 pgs.
Notice of Allowance dated Jan. 26, 2005 from U.S. Appl. No. 10/041,212.
ISR dated Jun. 10, 2003 from PCT Application No. PCT/US02/30610, 7 pgs.
PCT Written Opinion dated Jul. 15, 2003 from PCT Application No. PCT/US02/30610, 2 pgs.
Examiner's First Report dated Sep. 7, 2007 from AU Application No. 2002327737.
EPO Official Letter dated Nov. 19, 2007 from related EP Application No. 02763743.8.
Office Action dated Oct. 19, 2004 from EP Applicatin No. 02253034.9, 3 pgs.
Australian Examination Report dated Jul. 10, 2007 from AU Application No. 2001245529.
U.S. Office Action mailed Dec. 4, 2000 from U.S. Appl. No. 09/405,921.
U.S. Office Action mailed Apr. 20, 2001 from U.S. Appl. No. 09/405,921.
U.S. Office Action mailed Sep. 24, 2001 from U.S. Appl. No. 09/405,921.
U.S. Office Action mailed Jun. 14, 2002 from U.S. Appl. No. 09/405,921.
U.S. Office Action mailed Apr. 2, 2003 from U.S. Appl. No. 09/405,921.
U.S. Office Action mailed Oct. 3, 2003 from U.S. Appl. No. 09/405,921.
U.S. Office Action mailed Jun. 10, 2004 from U.S. Appl. No. 09/405,921.
Notice of Allowance mailed Dec. 3, 2004 from U.S. Appl. No. 09/405,921.
U.S. Office Action mailed Apr. 14, 2003 from U.S. Appl. No. 09/847,051.
U.S. Office Action mailed Nov. 4, 2003 from U.S. Appl. No. 09/847,051.
U.S. Office Action mailed May 6, 2004 from U.S. Appl. No. 09/847,051.
Notice of Allowance mailed Nov. 4, 2004 from U.S. Appl. No. 09/847,051.
U.S. Office Action mailed Aug. 29, 2001 from U.S. Appl. No. 09/520,405.
U.S. Office Action mailed Aug. 2, 2002 from U.S. Appl. No. 09/520,405.
U.S. Office Action mailed Mar. 20, 2003 from U.S. Appl. No. 09/520,405.
U.S. Office Action mailed Sep. 8, 2003 from U.S. Appl. No. 09/520,405.
U.S. Office Action mailed Sep. 3, 2004 from U.S. Appl. No. 09/520,405.
U.S. Office Action mailed Dec. 20, 2005 from U.S. Appl. No. 09/520,405.
U.S. Office Action mailed Jul. 14, 2006 from U.S. Appl. No. 09/520,405.
U.S. Office Action mailed Mar. 7, 2007 from U.S. Appl. No. 09/520,405.
U.S. Office Action mailed Sep. 13, 2007 from U.S. Appl. No. 09/520,405.
U.S. Office Action mailed Jul. 8, 2008 from U.S. Appl. No. 09/520,405.
U.S. Office Action mailed Nov. 10, 2004 from U.S. Appl. No. 10/827,042, 12 pgs.
U.S. Office Action mailed Jan. 19, 2006 from U.S. Appl. No. 10/827,042, 12 pgs.
U.S. Office Action mailed Feb. 12, 2007 from U.S. Appl. No. 10/827,042.
Notice of Allowance mailed Aug. 23, 2007 form U.S. Appl. No. 10/827,042.
Allowed claims from U.S. Appl. No. 10/827,042.
Supplemental Notice of Allowance mailed May 5, 2008 from U.S. Appl. No. 10/827,042.
European Search Report dated Dec. 12, 2003 from EP Applicatin No. 02253034.9, 3 pgs.
International Preliminary Examination Report dated Dec. 23, 2004 for PCT/US01/07447.
European Search Report dated Sep. 28, 2005 from corresponding EP Application No. 01918440.7, 3 pages.
U.S. Office Action dated Jan. 22, 2009 from related U.S. Appl. No. 10/134,657, 19 pgs.
Notice of Allowance dated Jan. 14, 2009 from U.S. Appl. No. 10/040,239.
U.S. Notice of Allowance dated Jan. 9, 2009 from U.S. Appl. No. 11/933,057.
U.S. Office Action mailed Mar. 18, 2009 from U.S. Appl. No. 09/520,405.
U.S. Office Action mailed Dec. 22, 2008 from U.S. Appl. No. 10/241,804.
U.S. Notice of Allowance mailed Jul. 14, 2009 from U.S. Appl. No. 10/241,804.
"Architecture for a Video Arcade Game Network," IBM Technical Disclosure Bulletin, Apr. 1, 1991, vol. 33, No. 11, pp. 138-141, NN9104138.
Oral Proceedings Mailed Sep. 15, 2008 In European Application No. 01918453.0.
Canadian Office Action mailed Dec. 30, 2008 in Application No. 2,402,389.
Australian Office Action mailed Dec. 1, 2008 In Application No. 2008200148.

Canadian Office Action mailed Nov. 6, 2008 in Application No. 2,402,351.
Examiner's First Report dated Apr. 10, 2006 from AU Appl. No. 2002341815.
Examiner's Second Report dated Jan. 10, 2008 from AU Application No. 2002341815.
Supplementary European Search Report dated Mar. 22, 2005 issued for EP 00 96 6846.
Office Action mailed Sep. 29, 2005 for EP Patent Application No. 00 96 6846.
Chatley, Robert et al., "MagicBeans: a Platform for Deploying Plugin Components," Component Deployment, Lecture Notes in Computer Science LNCS, Springer Verlag, Berlin/Heidelberg vol. 3083, May 1, 2004, pp. 97-112. Retrieved form the Internet, URL: http://pubs.doc.ic.ac.uk/MagicBeans/MagicBeans.pdf.
EP Supplementary Search Report dated Oct. 13, 2006 from related EP Application No. 02775968.7.
EP Supplementary Partial Search Report dated Apr. 17, 2007 from EP Application No. 01918453.0-2221.
Written Opinion of the International Searching Authority mailed Feb. 24, 2009 in Application No. PCT/US2008/087809 [P078X1WO].
International Search Report mailed Feb. 24, 2009 in Application No. PCT/US2008/087809 [P078X1WO].
U.S. Office Action dated Aug. 27,2010 issued in U.S. Appl. No. 09/520,405.
U.S. Examiner Interview Summary dated Apr. 9, 2010 issued in U.S. Appl. No. 09/520,405.
U.S. Office Action dated Oct. 27, 2009 issued in U.S. Appl. No. 09/520,405.
U.S. Advisory Action dated May 16, 2007 issued in U.S. Appl. No. 09/520,405.
Australian Office Action dated May 24, 2005 issued in AU77131-00.
Australian Office Action dated Nov. 17, 2003, issued in AU77131-00.
Australian Letter from Foreign Associate describing Australian Office Action dated Sep. 27, 2005 issued in AU37076/02.
Australian Notice of Opposition by Aritistocrat Technologies dated Dec. 17, 2008 issued in AU2001245529.
Australian Statement of Grounds and Particulars dated Mar. 13, 2009 filed in Support of Notice of Opposition by Aristocrat Technologies in AU2001245529.
Australian Amended Statement of Grounds and Particulars dated Mar. 26, 2009 filed in Support of Notice of Opposition by Aristocrat Technologies in AU2001245529.
Australian Notice of Withdrawal of Opposition dated Aug. 14, 2009 issued in AU2001245529.
Australian Examination Report dated Jan. 10, 2008 issued in AU200234185.
Canadian Office Action dated May 14, 2009 issued in CA2388765.
Canadian Office Action dated Jun. 9, 2010 issued in CA2384229.
Canadian Office Action dated Nov. 25, 2009 issued in CA2402389.
European Decision to Refuse Patent dated Oct. 15, 2007 issued in EP00966846.
European Summons to Attend Oral Proceedings dated Jul. 20, 2007 issued in EPO 096 6846.
European Summons to Attend Oral Hearing dated Feb. 20, 2008 issued in EP02253034.9.
European Minutes of Oral Proceedings dated Dec. 29, 2008 issued in EP02253034.9.
European Examination Report dated Jan. 27, 2009 issued in EP02253034.9.
European Decision to Grant Patent dated Jun. 12, 2009 issued in EP02253034.9.
European Examination Report dated Feb. 4, 2009 issued in EP07019395.8.
European Examination Report dated Nov. 5, 2009 issued in EP07019395.8.
European Supplementary Partial Search Report dated Apr. 17, 2007 issued in EP01918453.0.
European Examination Report dated Nov. 16, 2007 issued in EP01918453-0.
European Summons to Attend Oral Proceedings dated Sep. 15, 2008 issued in EP01918453.0.
European Supplementary Search Report dated Oct. 13, 2006 issued in EP0775968.7.
PCT International Preliminary Examination Report dated Mar. 24, 2004 issued in PCT/US00/26288.
PCT International Search Report dated Dec. 18, 2000 issued in PCT/US00/26288.
PCT International Search Report dated May 31, 2001 issued in W02001067218.
PCT International Preliminary Examination Report dated May 15, 2003 issued in PCT/US02/30286, 7 pgs.
"Fact Sheet on Digital Signature," information sheet dated May, 1994, National Institute of Standards and Technology, retrieved from the Internet at http://www.gist.gov/public_affairs/releases/digsigst.htm; 6 pgs.
"Is Your Career on Target?" (2002) EETimes Network marketing brochure, The Computer Language Company, Inc. (copyright 1981-2002) retrieved form the Internet at http://www.eetnetwork.com/encyclopedia, 7 pgs.
U.S. Examiner Interview Summary dated Mar. 23, 2006 issued in U.S. Appl. No. 10/308,845.
U.S. Advisory Action dated Oct. 12, 2006 issued in U.S. Appl. No. 10/308,845.
U.S. Notice of Abandonment dated Jul. 16, 2007 issued in U.S. Appl. No. 10/308,845.
U.S. Advisory Action dated Jul. 6, 2001 issued in U.S. Appl. No. 09/405,921.
U.S. Advisory Action and Interview Summary Oct. 25, 2002 issued in U.S. Appl. No. 09/405,921.
U.S. Advisory Action dated Feb. 17, 2004 issued in U.S. Appl. No. 09/405,921.
U.S. Miscellaneous Action dated Apr. 7, 2005 issued in U.S. Appl. No. 09/405,921.
U.S. Advisory Action dated Jul. 26, 2004 issued in U.S. Appl. No. 09/847,051.
U.S. Office Action (Notice of Panel Decision from Pre-appeal Brief Review) dated Jan. 28, 2011 issued in 09/520,405.
U.S. Office Action dated Dec. 22, 2010 issued in 11/932,752.
U.S. Office Action (Notice of Non-Compliant Amendment) dated May 18, 2005 issued in issued in 10/134,657.
U.S. Office Action Final dated Dec. 29, 2009 issued in U.S. Appl. No. 10/134,657.
U.S. Office Action Final dated May 28, 2010 issued in 10/134,657.
U.S. Notice of Abandonment dated Jan. 6, 2011 issued in 10/134,657.
PCT International Search Report dated Apr. 23, 2004 issued in WO 2004/051588.
Australian Examiner's First Report dated Feb. 20, 2009 in AU2003293029.
Canadian Notice of Abandonment dated Jan. 19, 2011 issued in 2,508,120.
Russian Office Action—Resolution (notice of grant) dated Nov. 21, 2008 issued in RU2005118989.
AU Description of Office Action dated Sep. 27, 2005 issued in AU 37076/02.
European Examination Report dated Oct. 19, 2004 issued in EP02253034.9, 3 pgs.
Canadian Office Action dated Nov. 22, 2010 issued in CA2,402,389.
PCT International Search Report dated May 31, 2001 issued in PCT/US01/07381 (WO 2001/067218).

* cited by examiner

COMPUTERIZED GAMING SYSTEM, METHOD AND APPARATUS

FIELD OF THE INVENTION

The invention relates generally to computerized gaming systems, and more specifically to a game code and operating system method and apparatus for use within computerized gaming systems.

NOTICE OF CO-PENDING APPLICATIONS

This application is related to co-pending application Ser. No. 09/405,921 filed Sep. 24, 1999, and to co-pending application Ser. No. 09/520,405, filed Mar. 8, 2000, which are hereby incorporated by reference.

BACKGROUND OF THE INVENTION

Games of chance have been enjoyed by people for thousands of years and have enjoyed increased and widespread popularity in recent times. As with most forms of entertainment, players enjoy playing a wide variety of games and new games. Playing new games adds to the excitement of "gaming." As is well known in the art and as used herein, the term "gaming" and "gaming devices" are used to indicate that some form of wagering is involved, and that players must make wagers of value, whether actual currency or some equivalent of value, e.g., token or credit.

One popular game of chance is the slot machine. Conventionally, a slot machine is configured for a player to wager something of value, e.g., currency, house token, established credit or other representation of currency or credit. After the wager has been made, the player activates the slot machine to cause a random event to occur. The player wagers that particular random events will occur that will return value to the player. A standard device causes a plurality of reels to spin and ultimately stop, displaying a random combination of some form of indicia, for example, numbers or symbols. If this display contains one of a pre-selected plurality of winning combinations, the machine releases money into a payout chute or increments a credit meter by the amount won by the player. For example, if a player initially wagered two coins of a specific denomination and that player achieved a payout, that player may receive the same number or multiples of the wager amount in coins of the same denomination as wagered.

There are many different formats for generating the random display of events that can occur to determine payouts in wagering devices. The standard or original format was the use of three reels with symbols distributed over the face of the wheel. When the three reels were spun, they would eventually each stop in turn, displaying a combination of three symbols (e.g., with three wheels and the use of a single payout line as a row in the middle of the area where the symbols are displayed). By appropriately distributing and varying the symbols on each of the reels, the random occurrence of predetermined winning combinations can be provided in mathematically predetermined probabilities. By clearly providing for specific probabilities for each of the pre-selected winning outcomes, precise odds that would control the amount of the payout for any particular combination and the percentage return on wagers for the house could be readily controlled.

Other formats of gaming apparatus that have developed in a progression from the pure slot machine with three reels have dramatically increased with the development of video gaming apparatus. Rather than have only mechanical elements such as wheels or reels that turn and stop to randomly display symbols, video gaming apparatus and the rapidly increasing sophistication in hardware and software have enabled an explosion of new and exciting gaming apparatus. The earlier video apparatus merely imitated or simulated the mechanical slot games in the belief that players would want to play only the same games. Early video games therefore were simulated slot machines. The use of video gaming apparatus to play new games such as draw poker and Keno broke the ground for the realization that there were many untapped formats for gaming apparatus. Now casinos may have hundreds of different types of gaming apparatus with an equal number of significant differences in play. The apparatus may vary from traditional three reel slot machines with a single payout line, video simulations of three reel video slot machines, to five reel, five column simulated slot machines with a choice of twenty or more distinct paylines, including randomly placed lines, scatter pays, or single image payouts. In addition to the variation in formats for the play of games, bonus plays, bonus awards, and progressive jackpots have been introduced with great success. The bonuses may be associated with the play of games that are quite distinct from the play of the original game, such as the video display of a horse race with "bets" on the individual horses randomly assigned to players that qualify for a bonus, the spinning of a random wheel with fixed amounts of a bonus payout on the wheel (or simulation thereof), or attempting to select a random card that is of higher value than a card exposed on behalf of a virtual "dealer."

Examples of such gaming apparatus with a distinct bonus feature includes U.S. Pat. Nos. 5,823,874; 5,848,932; 5,836,041; U.K. Patent Nos. 2 201 821 A; 2 202 984 A; and 2 072 395A; and German Patent DE 40 14 477 A1. Each of these patents differ in fairly subtle ways as to the manner in which the bonus round is played. British patent 2 201 821 A and DE 37 00 861 A1 describe a gaming apparatus in which after a winning outcome is first achieved in a reel-type gaming segment, a second segment is engaged to determine the amount of money or extra games awarded. The second segment gaming play involves a spinning wheel with awards listed thereon (e.g., the number of coins or number of extra plays) and a spinning arrow that will point to segments of the wheel with the values of the awards thereon. A player will press a stop button and the arrow will point to one of the values. The specification indicates both that there is a level of skill possibly involved in the stopping of the wheel and the arrow(s), and also that an associated computer operates the random selection of the rotatable numbers and determines the results in the additional winning game, which indicates some level of random selection in the second gaming segment.

U.S. Pat. Nos. 5,823,874 and 5,848,932 describe a gaming device comprising: a first, standard gaming unit for displaying a randomly selected combination of indicia, said displayed indicia selected from the group consisting of reels, indicia of reels, indicia of playing cards, and combinations thereof; means for generating at least one signal corresponding to at least one select display of indicia by said first, standard gaming unit; means for providing at least one discernible indicia of a mechanical bonus indicator, said discernible indicia indicating at least one of a plurality of possible bonuses, wherein said providing means is operatively connected to said first, standard gaming unit and becomes actuatable in response to said signal. In effect, the second gaming event simulates a mechanical bonus indicator such as a roulette wheel or wheel with a pointing element.

A video terminal is another form of gaming device. Video terminals operate in the same manner as a conventional slot and video machine, except that a redemption ticket rather than an immediate payout is dispensed.

The vast array of electronic video gaming apparatus that is commercially available is not standardized within the industry or necessarily even within the commercial line of apparatus available from a single manufacturer. One of the reasons for this lack of uniformity or standardization is the fact that the operating systems that have been used to date in the industry are primitive. As a result, the programmer must often create code for each and every function performed by each individual apparatus.

Attempts have been made to create a universal gaming engine for a gaming machine and is described in Carlson U.S. Pat. No. 5,707,286. This patent describes a universal gaming engine that segregates the random number generator and transform algorithms so that this code need not be rewritten or retested with each new game application. All code that is used to generate a particular game is contained in a rule EPROM in the rules library 108. Although the step of segregating random number generator code and transform algorithms has reduced the development time of new games, further improvements are needed.

One significant economic disadvantageous feature with commercial video wagering gaming units that maintains an artificially high price for the systems in the market is the use of unique hardware interfaces in the various manufactured video gaming systems. The different hardware, the different access codes, the different pin couplings, the different harnesses for coupling of pins, the different functions provided from the various pins, and the other various and different configurations within the systems has prevented any standard from developing within the technical field. This is advantageous to the equipment manufacturer, because the games for each system are provided exclusively by a single manufacturer, and the entire systems can be readily obsoleted, so that the market will have to purchase a complete unit rather than merely replacement software, and aftermarket game designers cannot easily provide a single game that can be played on different hardware.

The invention of computerized gaming systems that include a common or "universal" video wagering game controller that can be installed in a broad range of video gaming apparatus without substantial modification to the game controller has made possible the standardization of many components and of corresponding gaming software within gaming systems. Such systems desirably will have functions and features that are specifically tailored to the unique demands of supporting a variety of games and gaming apparatus types, and doing so in a manner that is efficient, secure, and cost-effective to operate.

What is desired is an architecture and method providing a gaming-specific platform that features reduced game development time and efficient game operation, provides security for the electronic gaming system, and does so in a manner that is cost-effective for game software developers, gaming apparatus manufacturers, and gaming apparatus users. An additional advantage is that the use of the platform will speed the review and approval process for games with the various gaming agencies, bringing the games to market sooner.

SUMMARY OF THE INVENTION

The present invention in various embodiments provides a computerized wagering game method and apparatus that features an operating system kernel that may include selected device handlers that are disabled or removed. The present invention features a system handler application that is part of the operating system. The system handler loads and executes gaming program objects and features nonvolatile storage that facilitates sharing of information between gaming program objects. The system handler of some embodiments further provides an API library of functions callable from the gaming program shared objects, and facilitates the use of callback functions on change of data stored in a nonvolatile storage. A nonvolatile record of the state of the computerized wagering game is stored on the nonvolatile storage, providing protection against loss of the game status due to power loss. The system handler application in various embodiments includes a plurality of handlers, providing an interface to selected hardware and the ability to monitor hardware-related events.

DETAILED DESCRIPTION

Figure 1:
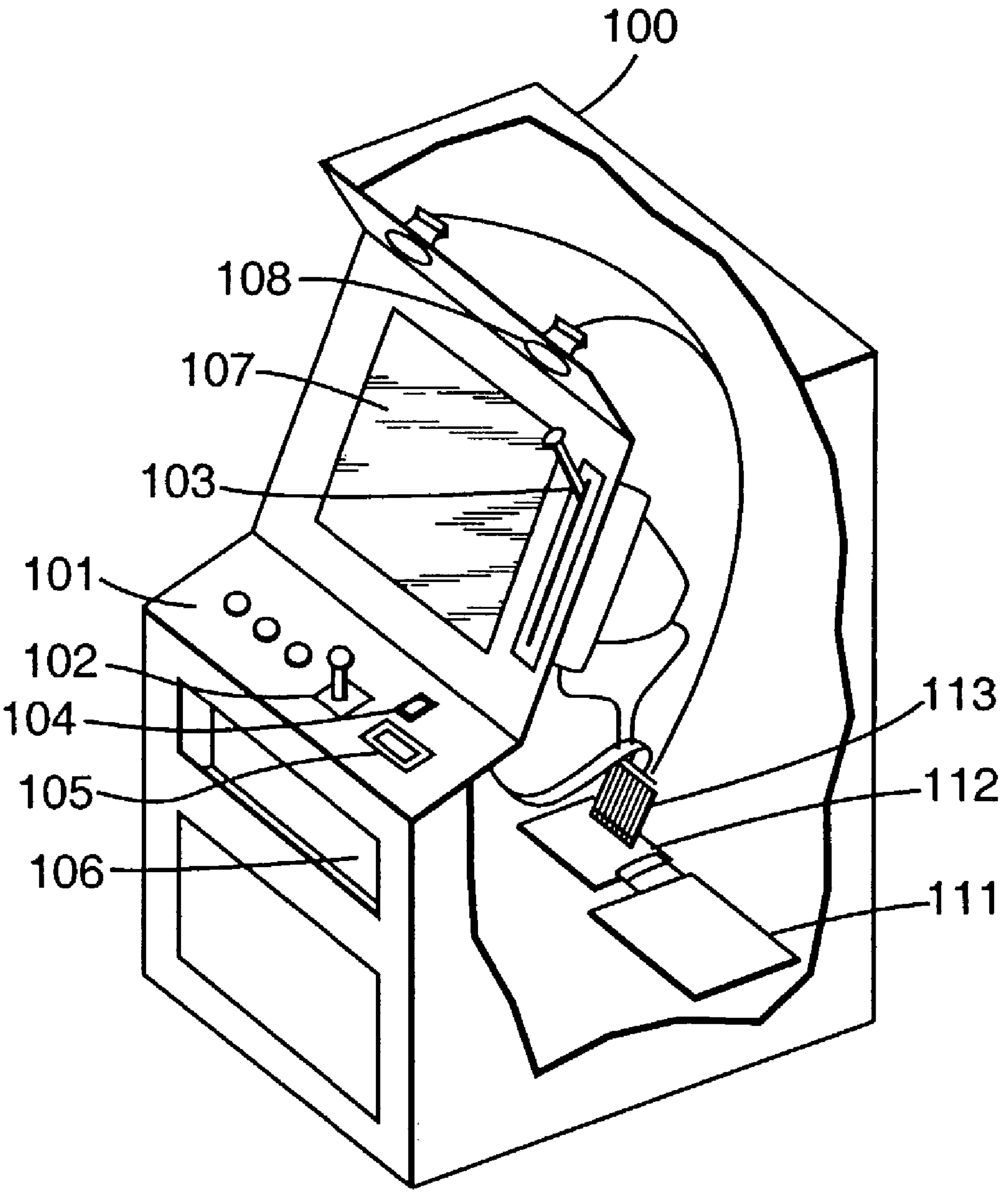
FIG. 1 shows a computerized wagering game apparatus as may be used to practice an embodiment of the present invention.

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Definitions

For purposes of this disclosure, the following terms have specialized meaning, and are defined below:

"Memory" for purposes of this disclosure is defined as any type of media capable of read/write capability. Examples of memory are RAM, tape and floppy disc.

"Shared Objects" for purposes of this disclosure are defined as self-contained, functional units of game code that define a particular feature set or sequence of operation for a game. The personality and behavior of a gaming machine of the present invention are defined by the particular set of shared objects called and executed by the operating system. Within a single game, numerous shared objects may be dynamically loaded and executed. This definition is in contrast with the conventional meaning of a shared object, which typically provides an API to multiple programs.

"Architecture" for purposes of this disclosure is defined as software, hardware or both.

"Dynamic Linking" for purposes of this disclosure is defined as linking at run time.

"API" for purposes of this disclosure is an Application Programming Interface. The API includes a library of functions.

"System Handler" for purposes of this disclosure is defined as a collection of code written to control non-game specific device handlers. Examples of device handlers include I/O, sound, video, touch screen, nonvolatile RAM and network devices.

"Gaming Data Variables" for purposes of this disclosure includes at a minimum any or all data needed to reconstruct the game state in the event of a power loss.

"Game.State File" for purposes of this disclosure is a template for creating a look-up list of information stored in NV RAM.

The present invention provides a computerized gaming system method and apparatus that have novel gaming-specific features that improve security, make development of game code more efficient, and do so using an apparatus and software methods that are cost-effective and efficient. The present invention also reduces the amount of effort required to evaluate and review new game designs by gaming regulators, because the amount of code to be reviewed for each game is reduced by as much as 80% over known, machine-specific architecture. The invention provides, in various embodiments, features such as a nonvolatile memory for storing gaming application variables and game state information, provides a shared object architecture that allows individual game objects to be loaded and to call common functions provided by a system handler application, and in one embodiment provides a custom operating system kernel that has selected device handlers disabled.

FIG. 1 shows an exemplary gaming system 100, illustrating a variety of components typically found in gaming systems and how they may be used in accordance with the present invention. User interface devices in this gaming system include push buttons 101, joystick 102, and pull arm 103. Credit for wagering maybe established via coin or token slot 104, a device 105 such as a bill receiver or card reader, or any other credit input device. A card reader 105 may also provide the ability to record credit information on a user's card when the user has completed gaming, or credit may be returned via a coin tray 106 or other credit return device. Information is provided to the user by devices such as video screen 107, which may be a cathode ray tube (CRT), liquid crystal display (LCD) panel, plasma display, light-emitting diode (LED) display, mechanical reels or wheels or other display device that produces a visual image under control of the computerized game controller. Also, buttons 101 may be lighted to indicate what buttons may be used to provide valid input to the game system at any point in the game. Still other lights or other visual indicators may be provided to indicate game information or for other purposes such as to attract the attention of prospective game users. Sound is provided via speakers 108, and also may be used to indicate game status, to attract prospective game users, to provide player instructions or for other purposes, under the control of the computerized game controller.

The gaming system 100 further comprises a computerized game controller 111 and I/O interface 112, connected via a wiring harness 113. The universal game controller 111 need not have its software or hardware designed to conform to the interface requirements of various gaming system user interface assemblies, but can be designed once and can control various gaming systems via the use of machine-specific I/O interfaces 112 designed to properly interface an input and/or output of the universal computerized game controller to the harness assemblies found within the various gaming systems.

In some embodiments, the universal game controller 111 is a standard IBM Personal Computer-compatible (PC compatible) computer. Still other embodiments of a universal game controller comprise general purpose computer systems such as embedded controller boards or modular computer systems. Examples of such embodiments include a PC compatible computer with a PC/104 bus that is an example of a modular computer system that features a compact size and low power consumption while retaining PC software and hardware compatibility. The universal game controller 111 provides all functions necessary to implement a wide variety of games by loading various program code on the universal controller, thereby providing a common platform for game development and delivery to customers for use in a variety of gaming systems. Other universal computerized game controllers consistent with the present invention may include any general-purpose computers that are capable of supporting a variety of gaming system software, such as universal controllers optimized for cost effectiveness in gaming applications or that contain other special-purpose elements yet retain the ability to load and execute a variety of gaming software. Examples of special purpose elements include elements that are heat resistant and are designed to operate under less than optimal environments that might contain substances such as dust, smoke, heat and moisture. Special purpose elements are also more reliable when used 24 hours per day, as is the case with most gaming applications.

The computerized game controller of some embodiments is a computer running an operating system with a gaming application-specific kernel. In further embodiments, a game engine layer of code executes within a non-application specific kernel, providing common game functionality. The gaming program shared object in such embodiments is therefore only a fraction of the total code, and relies on the game engine layer and operating system kernel to provide a library of gaming functions. A preferred operating system kernel is the public domain Linux 2.2 kernel available on the Internet. Still other embodiments will have various levels of application code, ranging from embodiments containing several layers of game-specific code to a single-layer of game software running without an operating system or kernel but providing its own computer system management capability.

Figure 2:
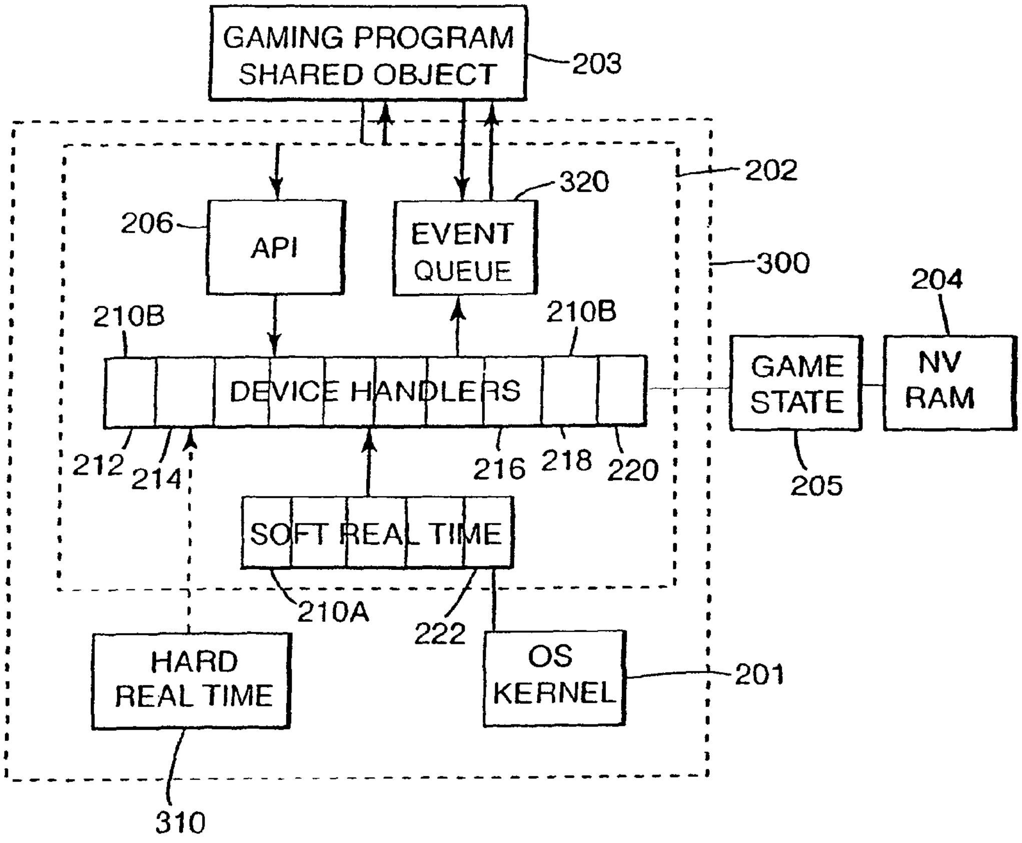
FIG. 2 shows a more detailed structure of program code executed on a computerized wagering game apparatus, consistent with an embodiment of the present invention.

FIG. 2 illustrates the structure of one exemplary embodiment of the invention, as may be practiced on a computerized gaming system such as that of FIG. 1. The invention includes an operating system 300, including an operating system kernel 201 and a system handler application 202. An operating system kernel 201 is first executed, after which a system handler application 202 is loaded and executed. The system handler application in some embodiments may load a gaming program shared object 203, and may initialize the game based on gaming data variables stored in nonvolatile storage 204. In some embodiments, the gaming data variables are further loaded into a Game.State data file or other data storage device 205, which reflects the data stored in nonvolatile storage 204. The nonvolatile RAM (NV-RAM) according to the invention has read/write capability. The gaming program object in some embodiments calls separate API functions 206, such as sound functions that enable the gaming apparatus to produce sound effects and music.

The OS kernel 201 in some embodiments may be a Linux kernel, but in alternate embodiments may be any other operating system providing a similar function. The Linux 2.2 operating system kernel in some further embodiments may be modified for adaptation to gaming architecture. Modifications may comprise erasing or removing selected code from the kernel, modifying code within the kernel, adding code to the kernel or performing any other action that renders the device handler code inoperable in normal kernel operation. By modifying the kernel in some embodiments of the invention, the function of the computerized gaming apparatus can be enhanced by incorporating security features, for example. In an embodiment, all modifications to the kernel are modular.

For example, as described in my co-pending application Ser. No. 10/182,534, entitled "Encryption in a Secure Computerized Gaming System" filed on the same date as the present application, several functions are incorporated into the kernel to verify that the operating system and shared object code have not changed, and that no new code has been incorporated into the operating system code or shared object code.

In one embodiment, the kernel is modified so that it executes user level code out of ROM. The use of the Linux operating system lends itself to this application because the source code is readily available. Other operating systems such as Windows and DOS are other suitable operating systems.

Embodiments of the invention include hard real time code 310 beneath the kernel providing real time response such as fast response time to interrupts. The hard real time code 310 is part of the operating system in one embodiment.

In an embodiment of the invention, all user interface peripherals such as keyboards, joysticks and the like are not connected to the architecture so that the operating system and shared objects retain exclusive control over the gaming machine. In another embodiment, selected device handlers are disabled so that the use of a keyboard, for example, is not possible. It is more desirable to retain this functionality so that user peripherals can be attached to service the machine. It might also be desirable to attach additional user peripherals such as tracking balls, light guns, light pens and the like.

In another embodiment, the kernel is modified to zero out all unused RAM. This function eliminates code that has been inserted unintentionally, such as through a Trojan horse, for example.

In one embodiment, the kernel and operating system are modified to hash the system handler and shared object or gaming program object code, and to hash the kernel code itself. These functions in different embodiments are performed continuously, or at a predetermined frequency.

The system handler application is loaded and executed after loading the operating system, and manages the various gaming program shared objects. In further embodiments, the system handler application provides a user Application Program Interface (API) 206, that includes a library of gaming functions used by one or more of the shared objects 210. For example, the API in one embodiment includes functions that control graphics, such as color, screen commands, font settings, character strings, 3-D effects, etc. The device handlers 210 are preferably handled by an event queue 320. The event queue schedules the event handlers in sequence. The shared object 203 calls the APIs 206 in one embodiment. The system handler application 202 in various embodiments also manages writing of data variables to the "game.state" file 205 stored in the nonvolatile storage 204, and further manages calling any callback functions associated with each data variable changed.

The system handler 202 application of some embodiments may manage the gaming program shared objects by loading a single object at a time and executing the object. When another object needs to be loaded and executed, the current object may remain loaded or can be unloaded and the new object loaded in its place before the new object is executed. The various shared objects can pass data between objects by storing the data in nonvolatile storage 204, utilizing a game.state data storage device 205. For example, a "game.so" file may be a gaming program object file that is loaded and executed to provide operation of a feature set of a computerized wagering game, as a "bonus.so" gaming program object file is loaded and executed to provide a feature set of the bonus segment of play. Upon changing from normal game operation to bonus, the bonus.so is loaded and executed upon loading. Because the relevant data used by each gaming program object file in this example is stored in nonvolatile storage 204, the data may be accessed as needed by whatever gaming program object is currently loaded and executing.

The system handler application in some embodiments provides an API that comprises a library of gaming functions, enabling both easy and controlled access to various commonly used functions of the gaming system. Providing a payout in the event of a winning round of game play, for example, may be accomplished via a payout function that provides the application designer's only access to the hardware that pays out credit or money. Restrictions on the payout function, such as automatically reducing credits stored in nonvolatile storage each time a payout is made, may be employed in some embodiments of the invention to ensure proper and secure management of credits by the computerized gaming system. The functions of the API may be provided by the developer as part of the system handler application, and may be a part of the software provided in the system handler application package. The API functions may be updated as needed by the provider of the system handler application to provide new gaming functions as desired. In some embodiments, the API may simply provide functions that are commonly needed in gaming, such as computation of odds or random numbers, an interface to peripheral devices, or management of cards, reels, video output or other similar functions.

The system handler application 202 in various embodiments also comprises a plurality of device handlers 210, that monitor for various events and provide a software interface to various hardware devices. For example, some embodiments of the invention have handlers for nonvolatile memory 212, one or more I/O devices 214, a graphics engine 216, a sound device 218, or a touch screen 220. Also, gaming-specific devices such as a pull arm, credit receiving device or credit payout device may be handled via a device handler 222. Other peripheral devices may be handled with similar device handlers, and are to be considered within the scope of the invention. In one embodiment, the device handlers are separated into two types. The two types are: soft real time 210A and regular device handlers 210B. The two types of device handlers operate differently. The soft real time handler 210A constantly runs and the other handler 210B runs in response to events.

The nonvolatile storage 204 used to store data variables may be a file on a hard disc, may be nonvolatile memory, or may be any other storage device that does not lose the data stored thereon upon loss of power. In one embodiment the nonvolatile storage in battery-backed RAM. The nonvolatile storage in some embodiments may be encrypted to ensure that the data variables stored therein cannot be corrupted. Some embodiments may further include a game.state file 205, which provides a look-up table for the game data stored in nonvolatile storage 204. The game.state file is typically parsed prior to execution of the shared object file. The operating system creates a map of NVRAM by parsing the game.state file. The look-up table is stored in RAM. This look-up table is used to access and modify game data that resides in NVRAM 204. This game data can also be stored on other types of memory.

In some embodiments, a duplicate copy of the game data stored in NVRAM 204 resides at another location in the NVRAM memory. In another embodiment, a duplicate copy of the game data is copied to another storage device. In yet another embodiment, two copies of the game data reside on the NVRAM and a third copy resides on a separate storage device. In yet another embodiment, three copies of the game data reside in memory. Extra copies of the game data are required by gaming regulations in some jurisdictions.

Data written to the game state device must also be written to the nonvolatile storage device, unless the game state data device is also nonvolatile, to ensure that the data stored is not lost in the event of a power loss. For example, a hard disc in one embodiment stores a game.state file that contains an unencrypted and nonvolatile record of the encrypted data variables in nonvolatile storage flash programmable memory (not shown). Data variables written in the course of game operation are written to the game.state file, which may be encrypted and stored in the nonvolatile storage 204, upon normal shutdown. Loss of power leaves a valid copy of the most recent data variables in the game.state file, which may be used in place of the data in NVRAM in the event of an abnormal shutdown.

In an alternate embodiment, a game state device 205 such as a game.state file stored on a hard disc drive provides variable names or tags and corresponding locations in nonvolatile storage 204, in effect, providing a variable map of the nonvolatile storage. In one such embodiment, the nonvolatile storage may then be parsed using the data in the game state file 205, which permits access to the variable name associated with a particular nonvolatile storage location. Such a method permits access to and handling of data stored in nonvolatile storage using variable names stored in the game state file 205, allowing use of a generic nonvolatile storage driver where the contents of the nonvolatile storage are game-specific. Other configurations of nonvolatile storage such as a single nonvolatile storage are also contemplated, and are to be considered within the scope of the invention.

Callback functions that are managed in some embodiments by the system handler application 202 are triggered by changing variables stored in NVRAM 204. For each variable, a corresponding function may be called that performs an action in response to the changed variable. For example, every change to a "credits" variable in some embodiments calls a "display_credits" function that updates the credits as displayed to the user on a video screen. The callback function may be a function provided by the current gaming program shared object or can call a different gaming program object.

The gaming program's shared objects in some embodiments of the invention define the personality and function of the game. Program objects provide different game functions, such as bookkeeping, game operation, game setup and configuration functions, bonus displays and other functions as necessary. The gaming program objects in some embodiments of the invention are loaded and executed one at a time, and share data only through NVRAM 204 or another game data storage device. The previous example of unloading a game.so gaming program object and replacing it with a bonus.so file to perform bonus functions is an example of such use of multiple gaming program shared objects.

Each gaming program object may require certain game data to be present in NVRAM 204, and to be usable from within the executing gaming program shared object 203. The game data may include meter information for bookkeeping, data to recreate game on power loss, game history, currency history, credit information, and ticket printing history, for example. These files do not include operable code or functions.

The operating system of the present application is not limited to use in gaming machines. It is the shared object library rather than the operating system itself that defines the personality and character of the game. The operating system of the present invention can be used with other types of shared object libraries for other purposes.

For example, the operating system of the present invention can be used to control networked on-line systems such as progressive controllers and player tracking systems. The operating system could also be used for kiosk displays or for creating "picture in picture" features in gaming machines. A gaming machine could be configured so that a video slot player could place a bet in the sports book, then watch the sporting event in the "picture in picture" feature while playing his favorite slot game.

The present invention provides a computerized gaming apparatus and method that provides a gaming-specific platform that features reduced game development time and efficient game operation via the use of a system handler application that can manage independent gaming program objects and gaming-specific API, provides game functionality to the operating system kernel, provides security for the electronic gaming system via the nonvolatile storage and other security features of the system, and does so in an efficient manner that makes development of new software games relatively easy. Production and management of a gaming apparatus is also simplified, due to the system handler application API library of gaming functions and common development platform provided by the invention.

Figure 3:
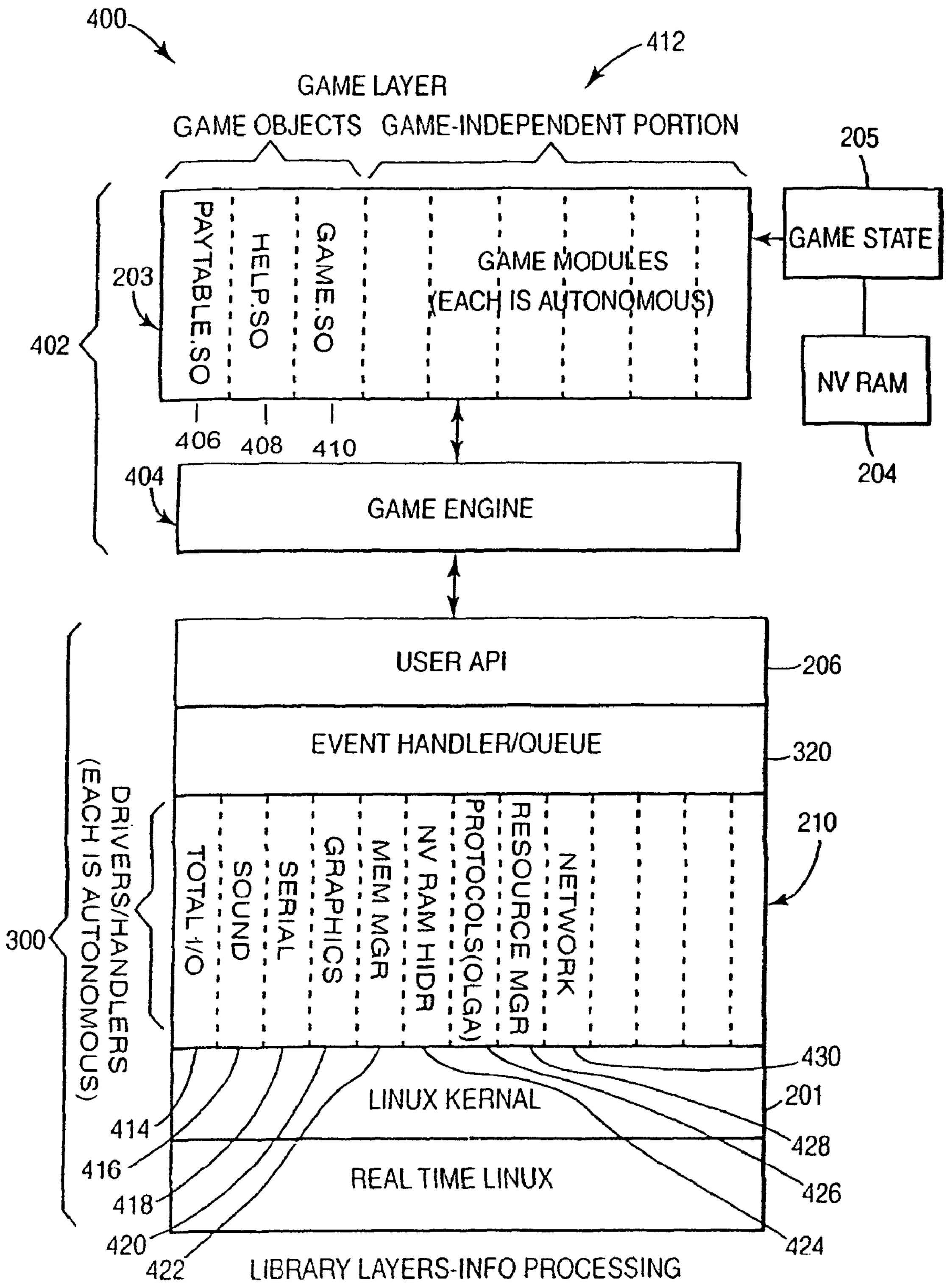
FIG. 3 is a diagram illustrating another exemplary embodiment of a universal gaming system according to the present invention having a universal or open operating system.

FIG. 3 is a diagram illustrating one exemplary embodiment of a gaming system 400 according to the present invention including universal operating system 300. As previously described herein, game layer 402 include gaming program shared objects 203 which are specific to the type of game being played on gaming system 400. Exemplary game objects or modules include paytable.so 406, help.so 408 and game.so 410. Game layer 402 also includes other game specific independent modules 412. Game engine 404 provides an interface between game layer 402 and universal operating system 300. The game engine 404 provides an additional application programming interface to the game layer application. The game engine automates core event handling for communicating with the game operating system 300, and which are not configurable via the specific game layer game code. The game engine 404 also provides housekeeping and game state machine functions. The game layer objects 203 and/or modules 406 may also directly call user API 206.

As previously described herein universal operating system 300 is an open operating system which allows for conversion of the gaming system 400 into different types of games, and also allows for future expandability and upgrading of associated hardware in the gaming system 400 due to its open architecture operating system.

In operating system 300, device handlers 210 provide the interface between the operating system 300 and external gaming system input and output devices, such as a button panel, bill acceptor, coin acceptor, mechanical arm, reels, speaker, tower lights, etc. Each device handler 210 is autonomous to the other. The device handlers or drivers 210 operate as protocol managers which receive information from a gaming system device (typically in the gaming system device protocol) and converts the information to a common open operating system protocol usable by operating system 300. Similarly, the device drivers or handlers 210 receive information from the open operating system and convert the information to a gaming device specific protocol. The specific device handlers or drivers used are dependent upon what game you are using, and may be loadable or unloadable as independent, separate objects or modules. The exemplary embodiment shown includes total I/O device handler 414, sound device handler 416, serial device handler 418, graphics device handler 420, memory manager device handler 422, NVRAM device handler 424, protocols device handler 426, resource manager device handler 428 and network device handler 430. Other suitable device handlers for adapting the operating system 300 to other gaming systems will become apparent to one skilled in the art after reading the present application.

Figure 4:
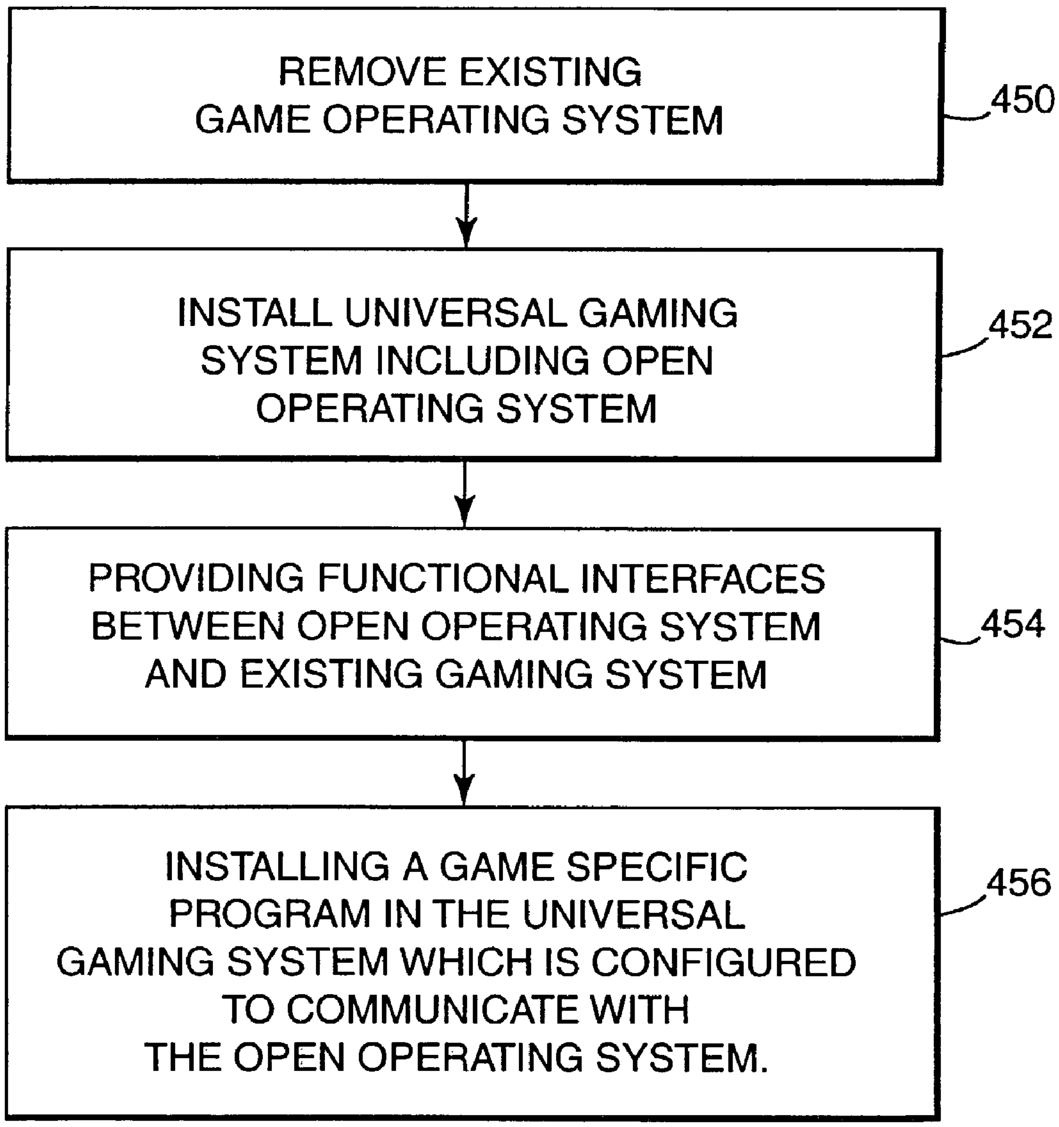
FIG. 4 is a diagram illustrating one exemplary embodiment of a method of converting a gaming system to a gaming system having an open operating system according to the present invention.

FIG. 4 is a diagram illustrating one exemplary embodiment of a method of converting an existing gaming operating system to a gaming system 400 having an open operating system 300 according to the present invention. The gaming system 400 according to the present invention. The gaming system 400 according to the present invention is suitable for converting both video based gaming systems and also electrical/mechanical based operating system, such as a mechanical reel based slot machine. Once the existing game operating system has been changed over to a universal gaming system 400 having a universal operating system 300 according to the present invention, the type of game itself may be changed via changing out the game specific code in the game layer 402.

At 450, the existing game operating system is removed from the game. The existing game operating system is typically a proprietary operating system consisting of computer hardware and software which is specific to the game being changed out. At 452, a universal gaming system 402 including an open operating system 300 is installed in the game. At 454, functional interfaces are provided between the open operating system and the existing gaming system devices. At 456, a game specific program (i.e., game layer 402) is installed in the universal gaming system. The game specific program is configured to communicate with the open operating system 300.

In one exemplary embodiment, the gaming system according to the present invention is used in a mechanical reel-based slot machine, either in a new slot machine or in converting an existing slot machine to an open operating system according to the present invention. Exemplary conventional reel-based slot machines include an IGT S-plus slot machine or a Bally slot machine.

Figure 5:
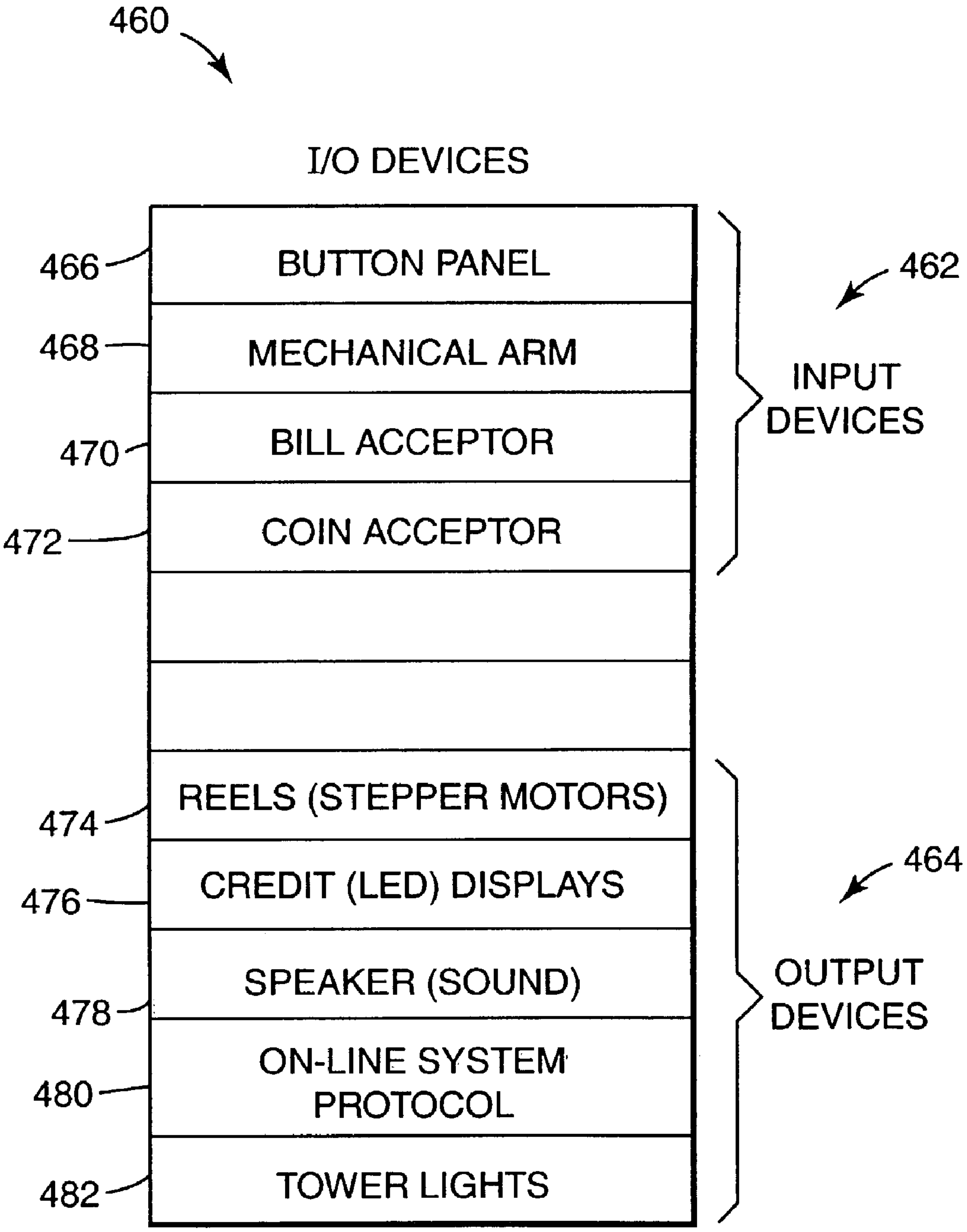
FIG. 5 is a diagram illustrating one exemplary embodiment of a set of devices used for interfacing with a device driver or handler in an open operating system in a gaming system according to the present invention.

FIG. 5 is a diagram illustrating one exemplary embodiment of I/O devices which must be functionally interfaced within adopting gaming system 402 to a reel-based game. The exemplary embodiment shown includes devices which interface with a digit I/O device driver. In one embodiment, input devices 462 includes a button panel device 466, a mechanical arm device 468, a bill acceptor device 470, and a coin acceptor device 472. Each of the input devices 462 receives information from the specific game devices and provides the information to the gaming system 400 via the I/O device driver.

Output devices 464 receive information from operating system 300 which provides an output via the I/O device driver to gaming devices 464. In the example shown, output devices 464 include reels device 474 which receives an output to the stepper motors controlling the reels. Credit displays device 466 which receives an output to the LED driven credit displays. Speaker device 478 which receives a sound output to the game speakers. On-line system protocol devices 480 which is a communication interface between the open operating system 300 and the game on-line system. Tower lights devices 42 which receives an interface between the open operating system 300 and the game tower lights.

Figure 6:
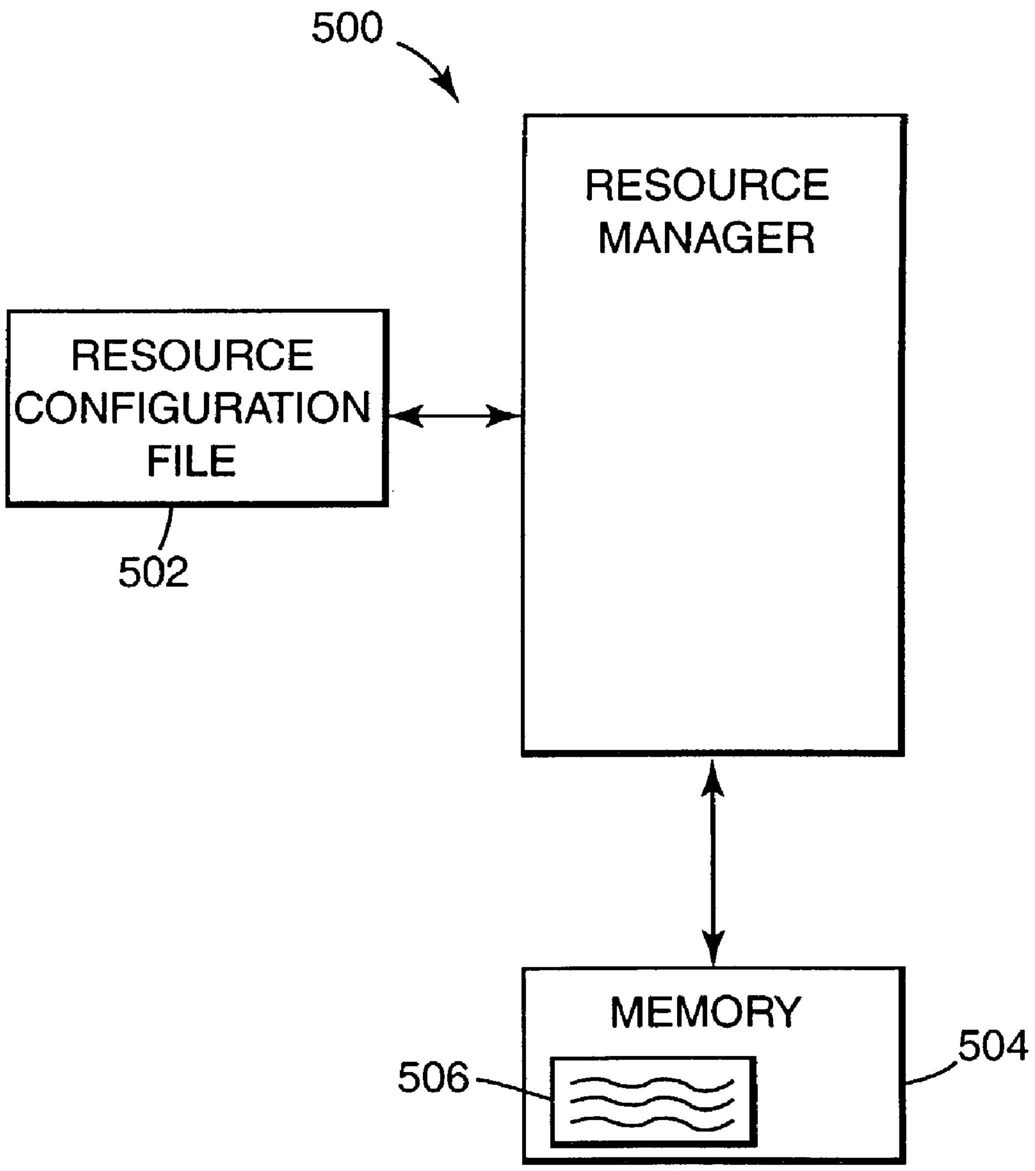
FIG. 6 is a diagram illustrating one exemplary embodiment of a resource manager used in a gaming system according to the present invention.

FIG. 6 is a diagram illustrating one exemplary embodiment of a resource manager used in a gaming system according to the present invention. The resource manager 500 is a software module which receive a resource configuration file 502 and stores it in memory 504. In one aspect, memory 504 is stored in nonvolatile memory, which in one embodiment is flash memory. The resource manager parses the resource configuration file and stores individual resources in memory for fast recall.

In one embodiment, the resource manager 500 stores the file 506 in the form of a lookup table. In one preferred embodiment, the resource manager reads the configuration files at startup, parses the configuration files and stores them in memory 504. The resource manager file 506 may then be accessed by the rest of the operating system 300 software applications. The resource manager operates to map digital I/O lines, corn ports, game specific resources, kernal modules to load, etc.

Figure 7:
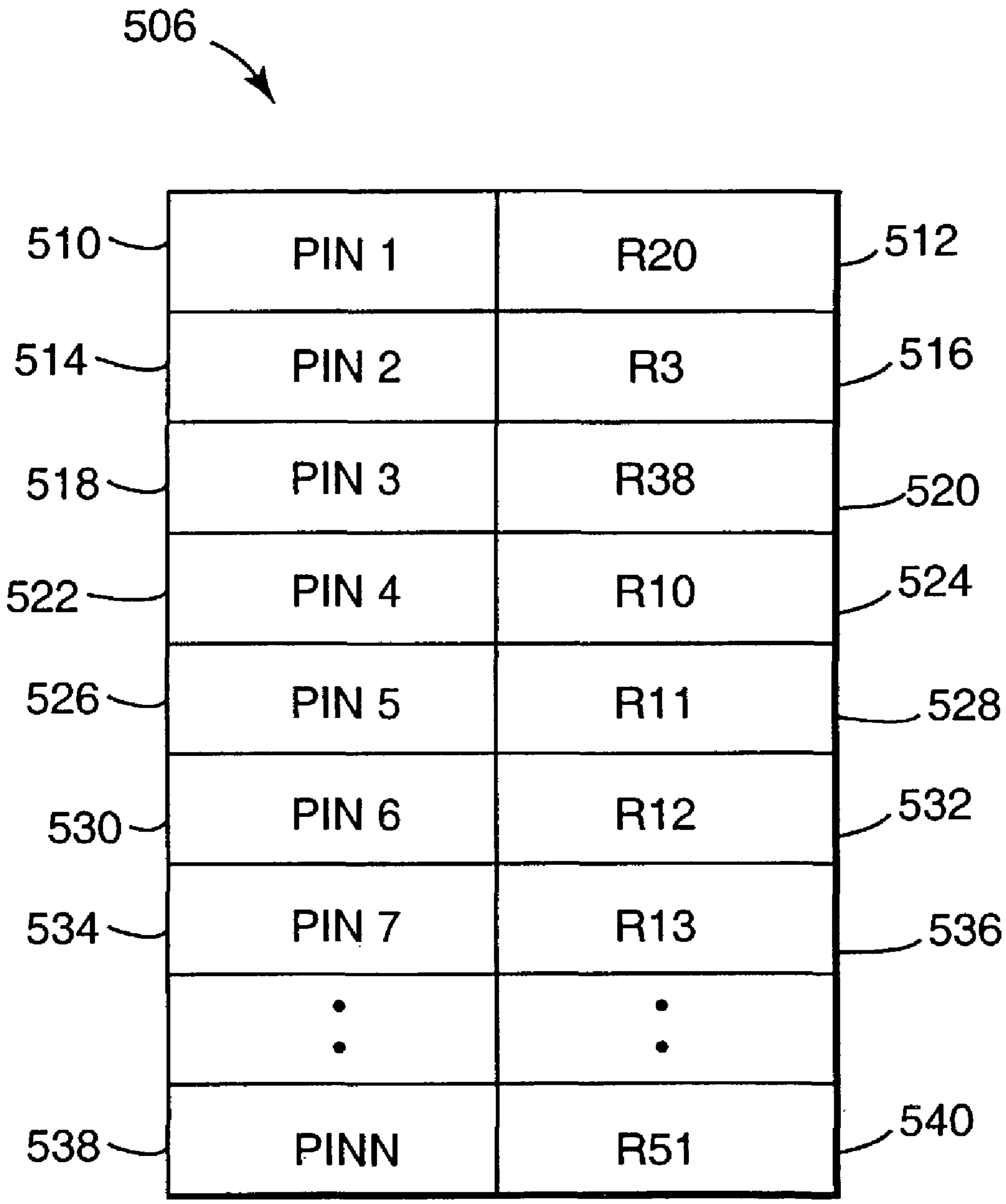
FIG. 7 is a diagram of a table illustrating one exemplary embodiment of a resource file used in a gaming system according to the present invention.

FIG. 7 is a diagram of a table illustrating one exemplary embodiment of a portion of a resource file 506 according to the present invention. The resource manager 500 operates to map the input/output (I/O) line to the operating system resources. Instead of changing pin locations for different games, the resource manger provides for mapping of I/O lines via software. In one aspect, 64, I/O (X8) lines are mapped to the various operating system resources. In one aspect, the I/O line at PIN1 510 is mapped to resource R20 512; and PIN2 514 is mapped to resource R3 516; PIN3 518 is mapped to resource R38 520; PIN4 522 is mapped to resource R10 524; PIN5 526 is mapped to resource R11 528; PIN6 530 is mapped to resource R12 532; PIN7 534 is mapped to resource R13 536; and PINN 538 is mapped to resource R51 540, etc.

The gaming system 400 according to the present invention is adaptable for use as a cashless gaming system. As such, it is useable for converting existing coin-based or token-based gaming systems into a cashless gaming system.

Figure 8:
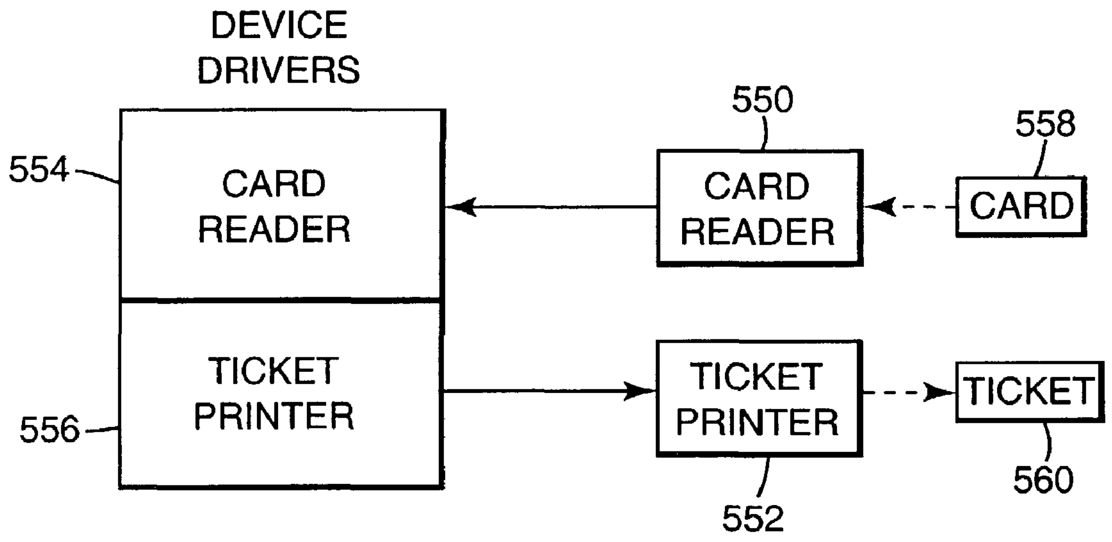
FIG. 8 is a diagram illustrating one exemplary embodiment of converting a cash, coin or token-based gaming system to a cashless gaming system using the universal gaming system according to the present invention.

FIG. 8 is a diagram illustrating one exemplary embodiment of converting cash, coin, or token-based gaming system to a cashless gaming system using the universal gaming system 400 according to the present invention. References also made to FIGS. 1-7 previously described herein. A card reader or coupon acceptor 550 and ticket printer 552 are added to the game. The card reader 550 and ticket printer 552 are easily adaptable to interface with the gaming system 400 according to the present invention. In particular, card reader device driver 554 is added to open operating system 300 to enable card reader 550 to communicate with the operating system. Similarly, a ticket printer device driver 556 is added to the operating system 300 in order to allow ticket printer 552 to communicate with the operating system. For example, an existing cash-based reel slot machine can be converted according to the present invention to a cashless gaming system. The card reader 550 can operate to read credit cards, magnetic strip based cards, or accept coupons which includes credits such as promotional gaming credits received from a casino. The card or coupons may be obtainable from a central or kiosk location. Once play is complete on the gaming system 400, the ticket printer 556 is operable to print a ticket representative of the amount of credits or money won on the gaming system. The ticket 560 may then be used as a card or coupon in another gaming system, or alternatively, may be turned in at a kiosk or central location for money.

Figure 9:
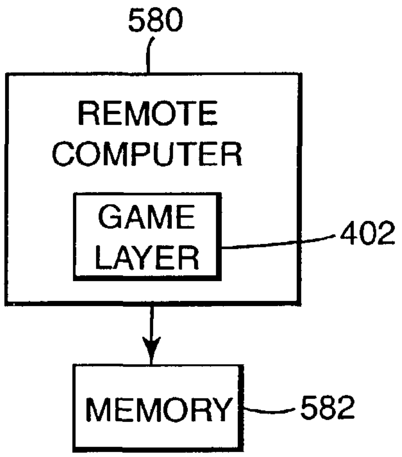
FIG. 9 is a diagram illustrating one exemplary embodiment of configuring a game usable in a gaming system according to the present invention.

FIG. 9 is a diagram illustrating another exemplary embodiment of the gaming system 400 according to the present invention. Due to the open operating system 300, game layer 402 may be configurable remote from the gaming system 400, such as on a remote computer or laptop computer 580. Game layer 402 is constructed into game objects or modules 302. As such, templates for specific types of games are configured to allow a game programmer to specify game specific configurable options from a remote computer 580. In another aspect, game specific modules are created on the remote computer 580. The game layer is then assembled and transferred into memory 582. In one aspect, memory 582 is nonvolatile memory located in the gaming system 400. In one aspect, the nonvolatile memory is flash memory. In one exemplary embodiment, the flash memory is a "Disk on a Chip", wherein the game layer 402 is downloaded from the remote computer 580 onto the disk on a chip 582.

Figure 10:
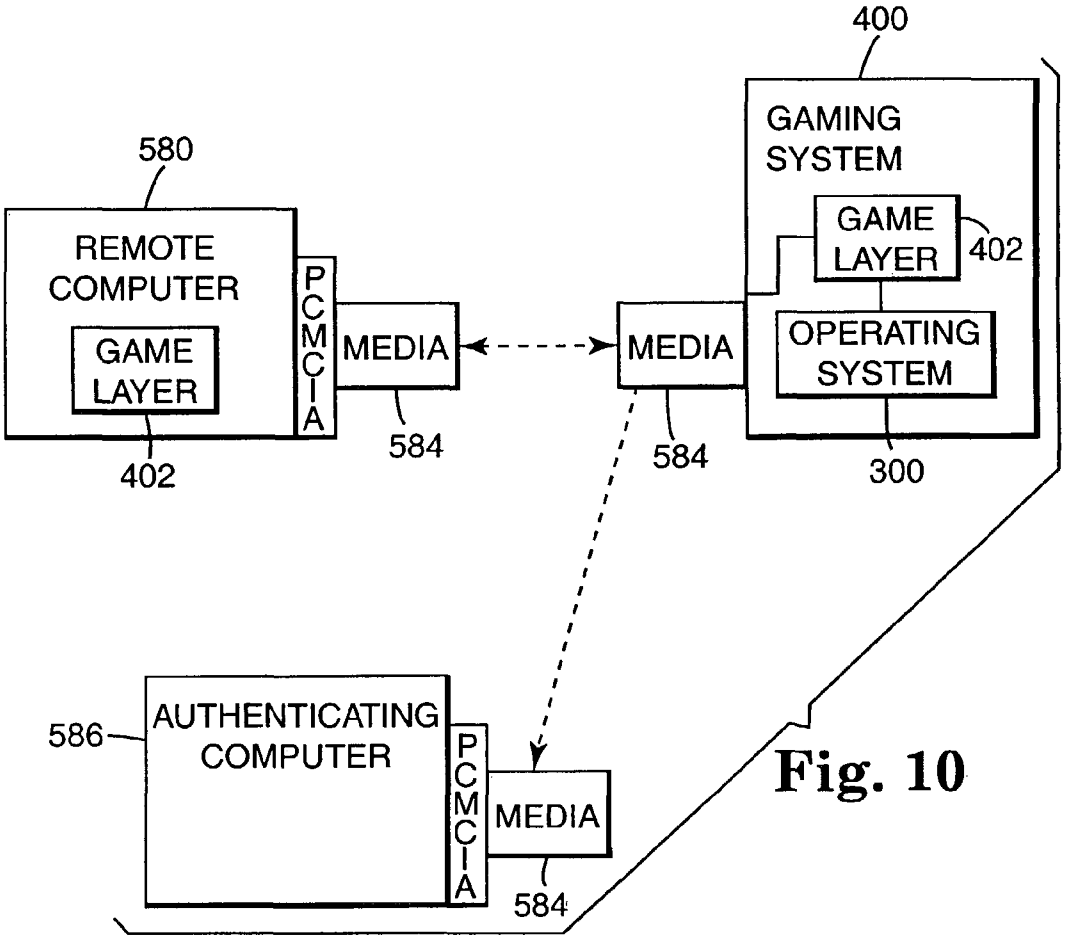
FIG. 10 is a diagram illustrating another exemplary embodiment of configuring and/or storing a game on a removable media useable in a gaming system according to the present invention.

FIG. 10 is a diagram illustrating another exemplary embodiment of programming and/or configuring a game layer at a location remote from the gaming system 400. In this embodiment, game layer 402 is programmed or configured on remote computer 580. After completion of configuring and/or programming game layer 402, the game layer 402 is transferred via remote computer 580 to a removable media 584. In one preferred embodiment, the removable media is a flash memory card, and more preferably is a CompactFlash card. In one aspect, the flash memory card plugs into remote computer 580 via a PCMCIA slot. Suitable flash memory cards (i.e., a CompactFlash card) are commercially available from memory manufacturers, including SanDisk and Kingston.

The removable media 584 is removed from remote computer 580 and inserted in gaming system 400. In one aspect, removable media 584 can be "hot-inserted" directly into the controller board of gaming system 400. The removable media 584 contains game layer 402 including the game specific code and program files. As such, removable media 584 remains inserted into gaming system 400 during operation of the gaming system. In an alternative embodiment, the game layer 402 can be transferred (e.g., via a memory download) from removable media 584 to memory inside of gaming system 400.

In one embodiment, the removable media 584 is maintained in gaming system 400 during operation of the gaming system. As such, the gaming system program files may be verified for authenticity by gaming officials by simply removing the removable media 584 and inserting it in a computer or controller used for verifying/authenticating game code, indicated at 586.

Figure 11:
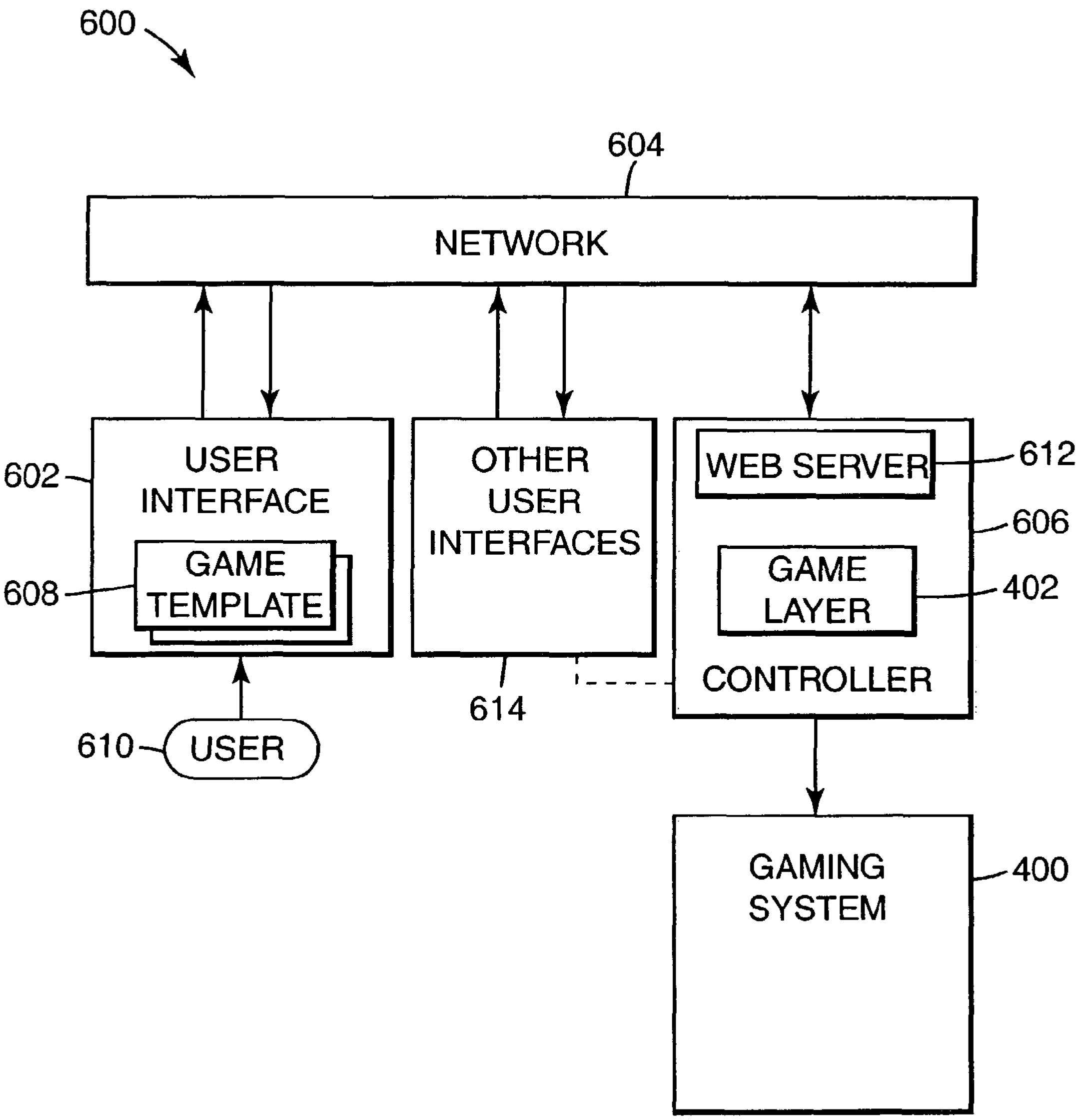
FIG. 11 is a diagram illustrating another exemplary embodiment of a gaming system according to the present invention wherein the game layer is programmable or configurable via a web page at a location remote from the gaming system.

FIG. 11 is another exemplary embodiment of a gaming system according to the present invention wherein the game layer is programmable or configurable at a location remote from the gaming system 400. In this embodiment, game layer 402 is configurable over a network based communication system. In one embodiment, network based system 600 includes a user interface 602, network or network communication link 604, and controller 606. Controller 606 is configured to communicate with user 610 via network 604. In particular, centralized controller 606 includes web server 612. User 610 accesses web server 612 via user interface 602, and downloads a web page suitable for configuring a game layer. In one aspect, the web page includes game specific game templates 608, which are utilized for inputting specific user configurations for individual games. Once a game template 608 has been configured, the game template is transferred to controller 606 via network 604. Controller 606 receives the configuration information associated with game template 608 and assembles game layer or program 402 using the configuration information. Game layer or program 402 can now be downloaded into memory in gaming system 400 for use by gaming system 400 including the game specific configurable options determined by user 610.

The system 600 also allow other user interfaces 614 for configuring games which may be assembled by controller 606 for use in other gaming systems. Alternatively, other user interface 614 may be representative of a gaming official checking the game 402 and authorizing use of the game 402 and gaming system 400. As such, the game 402 may be transferred to the gaming system 400 via controller 606, or via a communication link with user interface 64, which may be a direct connection or may be a network. Alternatively, game layer 402 may be transferred from controller 606 or user interface 614 by putting it on a flash memory device (e.g., Disk on a Chip or CompactFlash card) and physically inserted into gaming system 400.

Network 604, as used herein, is defined to include an internet network (e.g., the Internet), intranet network, or other high-speed communication system. In one preferred embodiment, network 44 is the Internet. While the exemplary embodiment and this detailed description refers to the use of web pages on the Internet network, it is understood that the use of other communication networks or next generation communication networks or a combination of communication networks (e.g., and intranet and the Internet) are within the scope of the present invention. The assembly of configuration information received from user interface 602 can be assembled into game layer 402 using hardware via a microprocessor, programmable logic, or state machine, in firmware, and in software within a given device. In one aspect, at least a portion of the software programming is web-based and written in HTML and JAVA programming languages, including links to the web pages for data collection, and each of the main components communicate via network 604 using a communication bus protocol. For example, the present invention may or may not use a TC/IP protocol suite for data transport. Other programming languages and communication bus protocols suitable for use with the system 600 according to the present invention will become apparent to those skilled in the art after reading the present application.

Figure 12:
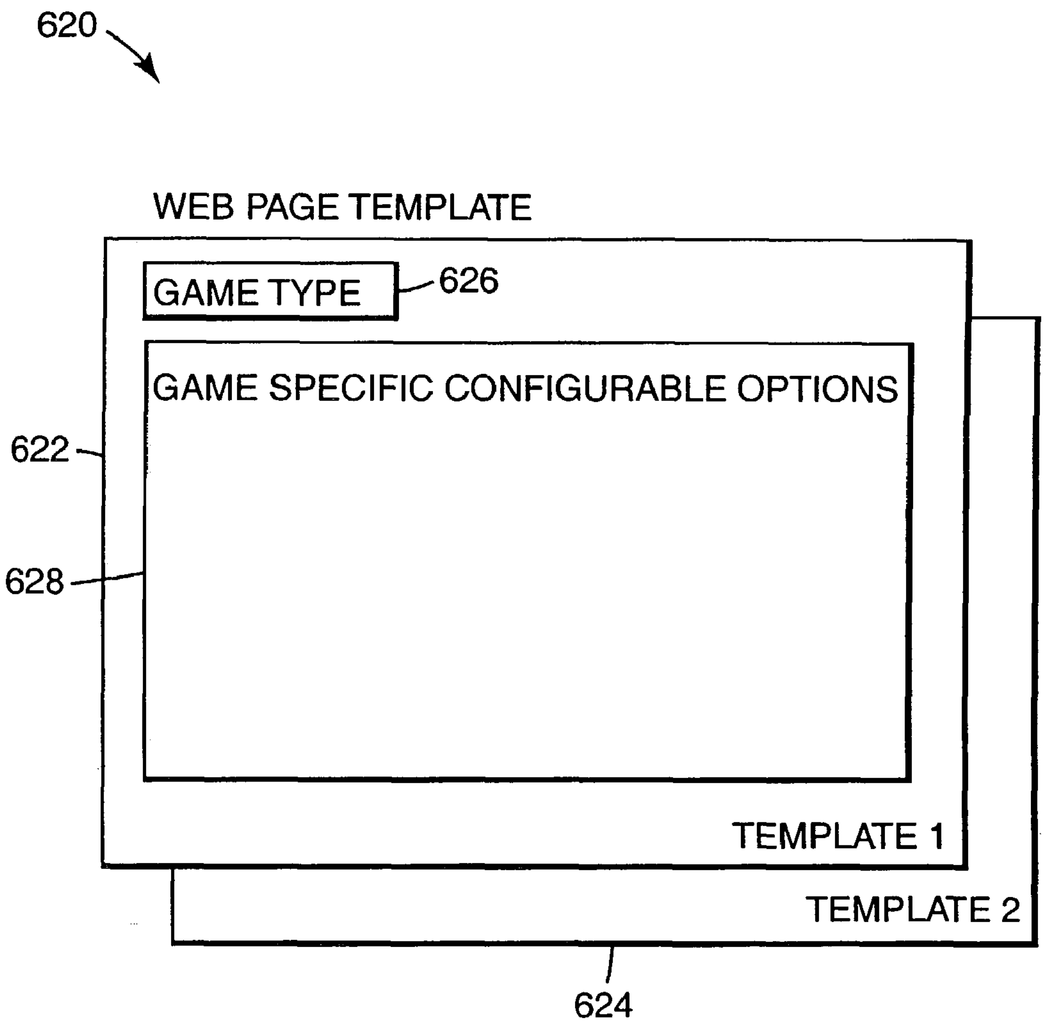
FIG. 12 is a diagram illustrating one exemplary embodiment of a web page template used in the gaming system shown in FIG. 11.

FIG. 12 is a diagram illustrating one exemplary embodiment of web page game templates used in the system shown in FIG. 11. Template 1 is shown at 622 and Template 2 is shown at 624. In one embodiment, upon accessing controller 606 via user interface 602, user 610 selects a game type that the user 610 would like to either program or configure. Based on the game type 626, a template appears at user interface 602 for that game type which allows the user to specify game configurable options, indicated at 628. The controller then operates to assemble the game layer or game programs 402 based on the information received via the game template. The configurable options may include any type of game specific configurable options, such as game colors, game sound, percentage payouts, game options, etc.

Figure 13:
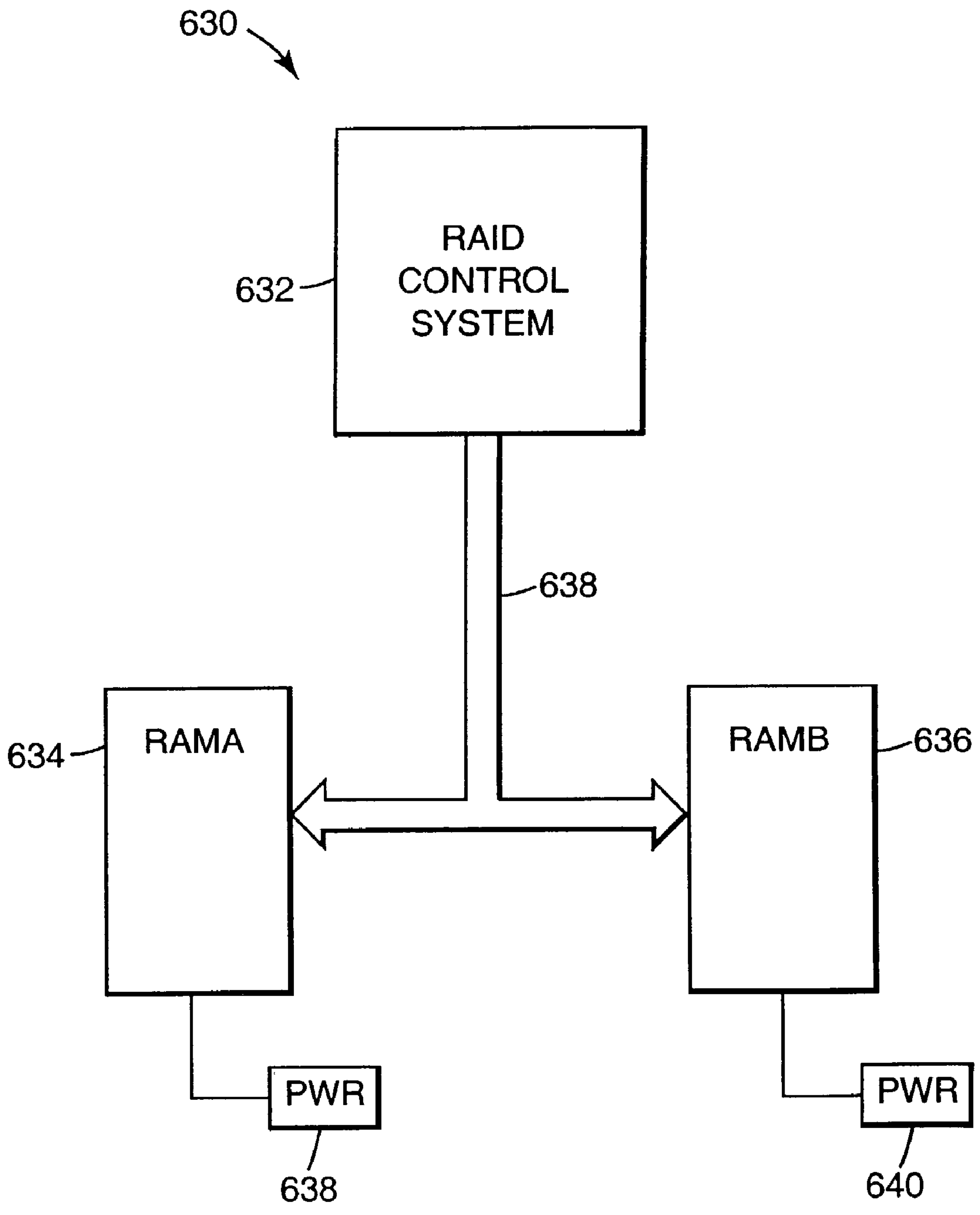
FIG. 13 is a diagram illustrating one exemplary embodiment of nonvolatile memory used in a gaming system according to the present invention, wherein the nonvolatile memory is configured as a RAID system.

FIG. 13 is a diagram illustrating one exemplary embodiment of nonvolatile RAM used in a gaming system 400 according to the present invention, wherein the nonvolatile RAM is configured as a redundant memory system. In one exemplary embodiment shown, the nonvolatile RAM is configured as a RAID system. In the hard disk drive industry, RAID (short for redundant array of independent disks) systems employ two or more disk drives in combination for improved disk drive fault tolerance and disk drive performance. RAID systems stripe a user's data across multiple hard disks. When accessing data, the RAID system allows all of the hard disks to work at the same time, providing increase in speed and reliability.

A RAID system configuration as defined by different RAID levels. The different RAID levels range from LEVEL 0 which provides data striping (spreading out of data blocks of each file across multiple hard disks) resulting in improved disk drive speed and performance but no redundancy. RAID LEVEL 1 provides disk mirroring, resulting in 100 percent redundancy of data through mirrored pairs of hard disks (i.e., identical blocks of data written to two hard disks). Other drive RAID levels provide variations of data striping and disk mirroring, and also provide improved error correction for increased performance and fault tolerance.

In FIG. 13, one exemplary embodiment of RAID data storage system used in a gaming system 400 according to the present invention is generally shown at 630. The RAID storage system 630 includes a controller or control system 632 and multiple nonvolatile RAM data storage units, indicated as RAMA 634 and RAMB 636. In one aspect, RAMA 634 and RAMB 636 each include a backup power system PWR 638 and PWR 640. In one aspect, backup power systems PWR 638 and PWR 640 are battery backup systems. RAMA 634 and RAMB 636 are configured to communicate with control system 632 as a redundant array of storage devices. Preferably, nonvolatile memory RAMA 634 and nonvolatile memory RAMB 636 are configured similar to a RAID level configuration used in the disk drive industry (i.e., as a "mirrored pair"). Nonvolatile memory RAMA 634 and nonvolatile memory RAMB 636 communicate with control system 632 via communication bus 638, using a communication bus protocol. One exemplary embodiment of a communication bus suitable for use as communication bus 638 is an industry standard ATA or uniform serial bus (USB) communication bus. Control system 632 includes a microprocessor based data processing system or other system capable of performing a sequence of logical operations. In one aspect, control system 632 is configured to operate the RAID system 630 nonvolatile memories RAMA 634 and RAMB 636 as a mirrored pair. As such, read/write to nonvolatile memory RAMA 634 are mirrored to nonvolatile RAMB 636, providing redundancy of crucial gaming specific data stored in nonvolatile memory RAMA 634 and RAMB 636. Alternatively, the nonvolatile memory RAMA 634 and nonvolatile memory RAMB 636 may be configured to communicate with control system 632 similar to other RAID storage system levels, such as RAID LEVEL 0, RAID LEVEL 2, RAID LEVEL 3, RAID LEVEL 4, RAID LEVEL 5, RAID LEVEL 6, etc. Further, the RAID system 630 may include more than the two nonvolatile memories RAMA 634 and RAMB 636 shown.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A computerized wagering game apparatus for converting a gaming machine to operate on a universal gaming system, the apparatus comprising:

a computerized game controller having a processor and a memory;

a game controller operable to control a first wager-based game played on the gaming machine;

a user interface comprising one or more game devices;

a wiring harness for connecting the game controller to the user interface; and a proprietary operating system comprising software that is written for a specific gaming machine hardware configuration and a specific game installed on the gaming machine; to remove the proprietary operating system from the gaming machine including the game controller operable to execute the proprietary operating system and to control the first wager game played on the gaming machine;

install a universal gaming system operable to control a second wager-based game on the gaming machine via the user interface, the universal gaming system including a game program layer, an open operating system, a universal controller for running the game program layer on the open operating system and a gaming machine specific input/output interface for providing a communication path between the wiring harness and the universal controller, said gaming machine specific input/output interface comprising a first interface for coupling to the wiring harness and a second interface for coupling to the universal controller wherein the universal controller is designed for communication compatibility with a plurality of different types of gaming machines via a particular gaming machine specific input/output interface associated with each of the different types of gaming machine and wherein the gaming machine is a first type of gaming machine in the plurality of different types of gaming machine;

provide a system handler application providing functional interfaces between the universal gaming system and the one or more game devices via the wiring harness wherein the functional interfaces include a resource manager for mapping input/output lines associated with the wiring harness to resources of the open operating system;

install a game specific program in the game program layer configured to operate with the open operating system, the gaming specific program having gaming program shared objects which are individually loaded and which call common functions, the system handler application interfacing the gaming program shared objects to game data for sharing the game data between at least two of the gaming program shared objects; and after installing the game specific program, configure the system handler application to include one or more device handlers for interfacing with the one or more game devices, wherein at least one of the device handlers is configured to act as a protocol manager to provide bidirectional communication between the one or more game devices and the open operating system, the one or more device handlers further configured to do the following:

receive first information from the one or more game devices in accordance with a gaming device specific protocol;

convert the first information to a common open operating system protocol usable by the open operating system;

provide the first information to the open operating system in accordance with the common open operating system protocol;

receive second information from the open operating system in accordance with the common open operating system protocol;

convert the second information to the gaming device specific protocol; and send the second information to the one or more game devices in accordance with the gaming device specific protocol.

2. The apparatus of claim 1, wherein the one or more device handlers are selected from the group A consisting of a total input/output device handler, a sound device handler, a serial device handler, a graphics device handler, a memory manager device handler, an NVRAM device handler, a protocols device handler, a resource manager device handler, and a network device handler.

3. The apparatus of claim 1, wherein the processor is further configured to define the open operating system to include an operating system kernel that executes the system handler application.

4. The apparatus of claim 1, wherein the gaming program shared objects are specific to the type of game played on the universal gaming system.

5. The apparatus of claim 1, wherein the processor is further configured to configure the game program layer to operate the game as a slot machine.

6. The apparatus of claim 1, comprising: wherein the processor is further configured to configure the open operating system to include a resource manager configured to map game specific resources.

7. The apparatus of claim 1, wherein the processor is further configured to convert the game to a cashless gaming system including defining the open operating system to include a system application handler, wherein the functional interface between the gaming system and the game devices is accomplished via the system application handler, and configure the system handler application to include one or more device handlers configured to interface with the game devices and to install a card reader device handler; and install a card reader in communication with the card reader device handler.

8. The apparatus of claim 4, wherein the processor is further configured to change the type of game played on the universal gaming system by changing the gaming program shared objects.

9. The apparatus of claim 5, wherein the processor is further configured to define the slot machine to be a mechanical reel-based slot machine.

10. The apparatus of claim 6, wherein the processor is further configured to parse a configuration file, map operating system resources based on the configuration file, and store the resource map in memory.

11. The apparatus of claim 7, wherein the processor is further configured to configure the system handler application to include a ticket printer device handler; and to install a ticket printer in communication with the ticket printer device handler.

12. The method apparatus of claim 7, wherein the processor is further configured to configure the game program layer to include a cashless gaming feature.

13. The apparatus of claim 10, wherein the processor is further configured to map input/output lines to system resources.

* * * * *